(12) United States Patent
Ukai et al.

(10) Patent No.: US 7,132,178 B2
(45) Date of Patent: Nov. 7, 2006

(54) HYDROGEN GENERATOR, FUEL CELL SYSTEM AND CONTROL METHOD OF HYDROGEN GENERATOR

(75) Inventors: Kunihiro Ukai, Nara (JP); Kiyoshi Taguchi, Osaka (JP); Hidenobu Wakita, Kyoto (JP); Seiji Fujiwara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 633 days.

(21) Appl. No.: 10/344,475

(22) PCT Filed: Jun. 11, 2002

(86) PCT No.: PCT/JP02/05766

§ 371 (c)(1),
(2), (4) Date: Jul. 10, 2003

(87) PCT Pub. No.: WO03/000585

PCT Pub. Date: Jan. 3, 2003

(65) Prior Publication Data

US 2004/0013917 A1  Jan. 22, 2004

(30) Foreign Application Priority Data

Jun. 12, 2001 (JP) ............................ 2001-176570
Jul. 5, 2001 (JP) ............................ 2001-204326
Oct. 3, 2001 (JP) ............................ 2001-307284

(51) Int. Cl.
*H01M 8/00* (2006.01)
*B01D 53/56* (2006.01)
*C01B 3/24* (2006.01)
*C01B 3/26* (2006.01)

(52) U.S. Cl. .................. 429/12; 423/243.01; 423/650; 423/652

(58) Field of Classification Search .................. 429/12; 423/243.01, 650, 652
See application file for complete search history.

(56) References Cited

U.S. PATENT DOCUMENTS 3,753,671 A * 8/1973 Leas et al. ..................... 48/210
5,302,470 A   4/1994 Okada et al.
6,294,276 B1 * 9/2001 Ogino .......................... 429/17
6,653,005 B1 * 11/2003 Muradov ...................... 429/19

FOREIGN PATENT DOCUMENTS

| EP | 1161991 | 9/2000 |
| EP | 1093852 | 4/2001 |
| JP | 58-161901 | 9/1983 |
| JP | 62-246802 | 10/1987 |

(Continued)

OTHER PUBLICATIONS

Office Action from the Patent Office of the State Intellectual Property Office of the People's Republic of China, dated Aug. 27, 204 (English Translation).

(Continued)

*Primary Examiner*—Dah-Wei Yuan
(74) *Attorney, Agent, or Firm*—RatnerPrestia

(57) ABSTRACT

A hydrogen generator including a raw material supplying unit supplying a raw material containing a sulfur component and composed of an organic compound, a water supplying unit supplying water, a reformer producing hydrogen gas, the reformer provided with a reforming catalyst to make the raw material and water undergo a reaction, and a carbon monoxide removing unit reducing the content of carbon monoxide in hydrogen gas produced in the reformer, wherein the reforming catalyst is constituted by a carrier composed of platinum and a metal oxide is provided.

11 Claims, 13 Drawing Sheets

FOREIGN PATENT DOCUMENTS

| | | |
|---|---|---|
| JP | 01-122902 | 5/1989 |
| JP | 2765950 | 4/1998 |
| JP | 2765950 B2 | 4/1998 |
| JP | 10-203801 | 8/1998 |
| JP | 2000-84410 | 3/2000 |
| JP | 2001-146406 | 5/2001 |
| JP | 2001-180912 | 7/2001 |
| JP | 2001-270704 | 10/2001 |
| JP | 2001-342004 | 12/2001 |
| JP | 2002-121007 | 4/2002 |
| WO | WO 00/54879 | 9/2000 |

OTHER PUBLICATIONS

Japanese International Search Report for PCT/JP02/05766, dated Oct. 29, 2002.

English translation of Japanese International Search Report for PCT/JP02/05766, dated Oct. 29, 2002.

* cited by examiner

INLUENCE OF CONCENTRATED SULFUR COMPONENT

INFLUENCE OF DILUTE SULFUR COMPONENT

HYDROGEN GENERATOR, FUEL CELL SYSTEM AND CONTROL METHOD OF HYDROGEN GENERATOR

This application is a U.S. national phase application of PCT International Application PCT/JP02/05766 filed on Jun. 11, 2002.

TECHNICAL FIELD

The present invention relates to a hydrogen generator of reforming a hydrocarbon based fuel to produce hydrogen, and the like.

BACKGROUND ART

For a hydrogen generator of producing a gas containing a large amount of hydrogen from an organic raw material such as natural gas and naphtha, a steam reforming method of applying heat from an external source to cause a reaction between a raw material and water on a reforming catalyst is often used. As the reforming catalyst, a catalyst having an Ni based or Ru based catalyst carried on a carrier such as alumina is generally used.

The organic material often contains a sulfur containing component such as an odorant component of urban gas or a sulfur component existing originally in crude oil or the like, for example. The sulfur component is essentially a catalytic poison component for many catalysts. Particularly, in the steam reforming method in which a reaction proceeds under a reduced condition, a sulfur component tends to remain on a catalyst, and its catalyst toxicity becomes stronger to cause a decrease in steam reforming reactivity.

Thus, a desulfurization unit to remove a sulfur component in a raw material in advance is often used in combination with the hydrogen generator. For removing an odorant component of a gas such as urban gas, an absorbent material such as zeolite can be used. In addition, for industrial applications, a hydrodesulfurization method is used in which hydrogen is added to the raw material, the sulfur component is made to react into hydrogen sulfide using a catalyst for hydrogenation such as an Mo based catalyst, and then the hydrogen sulfide is removed with an absorbent such as zinc oxide.

Next, there is an autothermal method in which a part of hydrocarbon based fuel is oxidized, and heat generated by the oxidation is used to cause a reaction between the remaining fuel and water, as a typical method of producing a gas containing a large amount of hydrogen from a hydrocarbon based fuel, in addition to the steam reforming method. When comparing the steam reforming method with the autothermal method, one has features which the other does not have.

In the steam reforming method, a produced gas is balanced with steam, hydrogen, carbon dioxide and carbon monoxide because no gas is introduced from the outside. In the autothermal method, the produced gas is balanced with steam, hydrogen, carbon dioxide, carbon monoxide and nitrogen if air is used as an oxidizing gas. Therefore, the steam reforming method can provide a gas containing a higher concentration of hydrogen from a viewpoint of hydrogen concentration.

In addition, the hydrocarbon based fuel contains a sulfur containing component such as an odorant component of urban gas or a sulfur component existing originally in crude oil or the like, for example. The sulfur component is essentially a catalytic poison component for many catalysts. Under a reduced condition, in particular, the sulfur component tends to remain on a catalyst. The steam reforming method essentially allows the reaction to proceed under a reduced condition, resulting in stronger catalytic poison toxicity. On the other hand, the autothermal method alleviates a decrease in catalytic activity due to the introduction of oxidation gas, and is thus more advantageous in terms of sulfur resistance.

An invention has been devised such that the content of sulfur component in the raw material is reduced to 0.1 ppb or smaller in advance using a copper-zinc based desulfurizing agent as in Japanese Patent Publication No. 2765950, in order to take advantage of the feature of the steam reforming method providing a high concentration of hydrogen.

In addition, a catalyst having an Ni or Ru based catalyst carried on a carrier such as alumina is used in a reformer to perform steam reforming as a reforming catalyst for use in the steam reforming method, but the Ni based catalyst exhibiting its capability under a reduced condition suffers a decrease in catalytic activity when oxidized. Also, the Ru based catalyst is volatile under an oxidized condition at a high temperature and thus suffers a decrease in activity. Nevertheless, during normal operation, many of reforming catalysts are used under a reduced condition in the presence of produced hydrogen gas, and therefore they hardly suffer a decrease in catalytic activity due to oxidation.

However, at the time of starting operation and stopping operation, air is introduced from the outside of the apparatus, and those catalysts may be oxidized depending on starting and stopping conditions. Therefore, at the time of starting or stopping operation, an operation for replacing residual gases with an inert gas such as nitrogen so that the catalyst is not oxidized is often used in combination.

In addition, if a combustible gas such as hydrogen is entrained in the apparatus at the time of stopping operation, residual gases are generally replaced with the inert gas because the presence of the combustible gas is not desirable in terms of apparatus safety.

The Ru based reforming catalyst has essentially low resistance to sulfur. Thus, the desulfurization method using the above-mentioned method using an absorbent material or the hydrodesulfurization causes a decrease in catalytic activity due to the presence of a sulfur component not sufficiently removed.

Thus, an invention has been devised such that the content of sulfur component in the raw material is reduced to 0.01 ppb or smaller in advance using a desulfurizing agent as in Japanese Patent Publication No. 2765950. In this method, the catalytic activity can be retained because the content of sulfur component in the raw material is reduced to 0.01 ppb or smaller. However, a method in which the desulfurization characteristic is improved to retain a catalytic activity has many problems such that the configuration of apparatus is complicated; it is difficult to manage the level of desulfurization and so on.

On the other hand, the Ni based reforming catalyst has high resistance to sulfur compared with the Ru based catalyst. Therefore, the reforming catalyst is compatible with the desulfurization method using the above-mentioned method using an adsorbent material or the hydrodesulfurization method. However, this Ni based reforming catalyst exhibits its steam reforming feature under a reduced condition. Thus there is a problem such that the reduced condition must be maintained in the apparatus to prevent a situation in which the catalyst is oxidized, and consequently suffers a decrease in catalytic activity even at the time of stopping the apparatus.

In addition, in the hydrodesulfurization method of removing a sulfur component, hydrogen should be added to the raw material in advance. Provided that the apparatus is operated continuously, the hydrogen can be collected in part from the exit of the apparatus and used. However, hydrogen should be obtained in advance at the time of starting the apparatus. If considering a hydrogen generator as a plant scale apparatus, the necessity to obtain hydrogen does not pose a serious problem. However, if considering a compact-type hydrogen generator, for example a hydrogen generator as a domestic hydrogen source, the necessity to obtain hydrogen poses a serious problem.

Also in the autothermal method, on the other hand, it is essentially desired that the concentration of sulfur in the raw material is lower, and the catalyst reactivity is decreased if the sulfur concentration is high. In addition, there is a problem such that the method cannot prevent a decrease in hydrogen concentration fundamentally.

In addition, in the method in which a desulfurizing agent is used to remove the sulfur containing component in the raw material, the catalyst reactivity is varied depending on the desulfurization condition of the desulfurizing agent, and therefore a method of correctly observing the state of the desulfurizing agent is required. In addition, establishment of a method of determining the poisoning state of the catalyst to recover the activity easily is desired.

In short, the conventional hydrogen generator has as a first problem a problem such that a sulfur containing component contained in the raw material cannot be adequately dealt with.

Next, when the hydrogen generator is continuously operated, an oxidized condition is not created in the apparatus. Therefore, in the case of continuously operating hydrogen generator used for industrial applications or on plant scales, there is little decrease in activity due to oxidation of the catalyst.

When the hydrogen generator is used for domestic applications, however, the apparatus may be started and stopped frequently. If a power generating apparatus is operated for domestic applications, for example, operations to deal with a load change of power are required, and thus the operation of the power generating apparatus is started and stopped frequently. If a fuel cell power generating apparatus is introduced as the power generating apparatus, the hydrogen generator supplying hydrogen serving as a fuel is used in combination. Therefore, the operation of the hydrogen generator should be started and stopped frequently.

For domestic applications, however, it is not easy to obtain an inert gas with which residual gases in the apparatus is replaced in terms of costs and maintenance.

In short, the conventional hydrogen generator has as a second problem a problem such that it is difficult to replace gases in the apparatus effectively and safely at the time of starting and stopping the apparatus.

DISCLOSURE OF THE INVENTION

The present invention is to solve the problems associated with the above described conventional hydrogen generator, and has as its object provision of a hydrogen generator having relatively high resistance to a sulfur containing component contained in a raw material. The present invention also has as its object provision of a hydrogen generator capable of safely and effectively replacing gases in the apparatus without using an inert gas at the time of starting and stopping the apparatus.

To achieve the above object, a 1st aspect of the present invention is a hydrogen generator comprising:

a reformer producing hydrogen gas, said reformer having a reforming catalyst body making a raw material react with water;

a raw material supplying unit supplying said raw material to said reformer; and a water supplying unit supplying said water to said reformer, wherein said reforming catalyst body is a carrier comprising platinum and a metal oxide.

A 2nd aspect of the present invention is the hydrogen generator according to the 1st aspect of the present invention, comprising hydrogen sulfide removing bodies provided in said reforming catalyst body.

A 3rd aspect of the present invention is the hydrogen generator according to the 2nd aspect of the present invention, wherein said reforming catalyst body has a plurality of sub-reforming catalyst bodies provided at predetermined intervals from the upstream to the downstream of the flow of said raw material, and said hydrogen sulfide removing bodies are provided in spaces corresponding to said predetermined intervals.

A 4th aspect of the present invention is the hydrogen generator according to the 3rd aspect of the present invention, comprising temperature detecting means of detecting the temperature of said sub-reforming catalyst body, and temperature controlling means of controlling the temperature of said reformer, wherein said temperature controlling means controls so that the operation temperature of the sub-reforming catalyst body located uppermost in said upstream, of said plurality of sub-reforming catalyst bodies, is in the range from a temperature at which the reaction between said water and said raw material starts to a temperature at which said hydrogen sulfide removing body starts the removal of a sulfur component.

A 5th aspect of the present invention is the hydrogen generator according to any of the 1st to the 4th aspects of the present inventions, wherein said metal oxide of said reforming catalyst body contains at least a Zr oxide.

A 6th aspect of the present invention is the hydrogen generator according to the 1st aspect of the present invention, comprising a hydrogen sulfide removing unit composed of a metal oxide or a metal, said sulfide removing unit provided immediately after said reformer, wherein hydrogen sulfide in hydrogen gas after said reformer is made to react with said metal oxide or metal to produce a metal sulfide.

A 7th aspect of the present invention is a hydrogen generator comprising:

a reformer producing hydrogen gas, said reformer provided with a reforming catalyst body making a raw material react with water;

a raw material supplying unit supplying said raw material to said reformer;

a water supplying unit supplying said water to said reformer;

an oxidation gas supplying unit supplying an oxidation gas containing at least oxygen to said reforming catalyst body; and a controlling unit for feed rate controlling the supply of said raw material, said water and said oxidation gas, wherein the amount of oxidation gas supplied from said oxidation gas supplying unit to said reforming catalyst body is defined based on the content of sulfur component contained in said raw material.

An 8th aspect of the present invention is the hydrogen generator according to the 7th aspect of the present invention, wherein said amount of oxidation gas is defined as an amount allowing at least said sulfur component to be at least fully oxidized.

A 9th aspect of the present invention is the hydrogen generator according to the 7th aspect of the present invention, comprising a sulfur concentration detecting unit measuring the content of sulfur component contained in said raw material, wherein the amount of oxidation gas supplied from said oxidation gas supplying unit to said reforming catalyst body is defined based on the content of sulfur component measured by said sulfur concentration detecting unit.

A 10th aspect of the present invention is the hydrogen generator according to the 7th aspect of the present invention, comprising a temperature detecting unit measuring the temperatures of said reforming catalyst body and/or a gas in said reforming catalyst body, wherein said controlling unit for feed rate compares the detected temperature detected by said temperature detecting unit with a predetermined reference value determined in advance, and a temperature equal to or higher than said reference value indicates that the content of said sulfur component increases at the time when said raw material, said water and said oxidation gas are supplied in predetermined reference amounts.

An 11th aspect of the present invention is the hydrogen generator according to the 10th aspect of the present invention, wherein said controlling unit for feed rate controls so that the oxidation gas is supplied in an amount larger than said reference amount if said detected temperature exceeds said reference value.

A 12th aspect of the present invention is the hydrogen generator according to the 10th aspect of the present invention, wherein if said detected temperature exceeds said reference value, said controlling unit for feed rate controls so that at the time of stopping the generation of hydrogen gas, the oxidation gas is supplied in an amount larger than said predetermined reference amount, and thereafter the supply of said raw material, said water and said oxidation gas is stopped.

A 13th aspect of the present invention is the hydrogen generator according to the 10th aspect of the present invention, comprising a memory unit memorizing the fact that said detected temperature exceeds said reference value, wherein if said memory unit remembers the fact that said reference value has been exceeded at the time of starting the apparatus, said controlling unit for feed rate controls so that the oxidation gas is supplied in an amount larger than said predetermined reference amount, and thereafter said raw material, said water and said oxidation gas are supplied in said predetermined reference amount.

A 14th aspect of the present invention is the hydrogen generator according to the 10th aspect of the present invention, wherein said temperature detecting unit is provided at a location allowing said temperature detecting unit to measure the temperatures of said reforming catalyst body and/or a gaseous body in said reforming catalyst body located from the midstream to the downstream with respect to the flow of said raw material in said reformer.

A 15th aspect of the present invention is a hydrogen generator comprising:

a reformer producing hydrogen gas, said reformer provided with a reforming catalyst body making a raw material react with water;

a raw material supplying unit supplying said raw material to said reformer;

a water supplying unit supplying said water to said reformer;

an oxidation gas supplying unit supplying an oxidation gas containing at least oxygen to said reformer; and a controlling unit for feed rate controlling the supply of said raw material, said water and said oxidation gas at the time of starting and/or stopping the apparatus.

A 16th aspect of the present invention is the hydrogen generator according to the 15th aspect of the present invention, wherein said controlling unit for feed rate performs control so that the supply of said oxidation gas is started in a state in which said raw material and said water are supplied at the time of stopping the apparatus, and the supply of said raw material, said water and said oxidation gas is stopped after predetermined time elapses after the supply of said oxidation gas is started.

A 17th aspect of the present invention is the hydrogen generator according to the 16th aspect of the present invention, wherein said controlling unit for feed rate performs control so that said oxidation gas is supplied in an amount equal to or larger than the theoretical amount of oxygen for completely oxidizing said raw material, and thereafter the supply of said water is stopped.

A 18th aspect of the present invention is the hydrogen generator according to the 16th aspect of the present invention, wherein said controlling unit for feed rate performs control so that the supply of said oxidation gas is stopped after predetermined time elapses after the supply of said raw material and water is stopped.

A 19th aspect of the present invention is the hydrogen generator according to the 16th aspect of the present invention, wherein said controlling unit for feed rate performs control so that the amounts of said raw material and said water supplied are reduced, and the amount of said oxidation gas supplied is reduced at the time of stopping the apparatus.

A 20th aspect of the present invention is the hydrogen generator according to the 19th aspect of the present invention, wherein control is performed so that the ratio of the decrement of the amount of said oxidation gas supplied to the decrement of the amount of said raw material supplied is kept at a predetermined level.

A 21st aspect of the present invention is the hydrogen generator according to the 15th aspect of the present invention, wherein said controlling unit for feed rate performs control so that the supply of said oxidation gas is started, and the supply of said raw material and water is started after predetermined time elapses while the supply of said oxidation gas is continued at the time of starting the apparatus.

A 22nd aspect of the present invention is the hydrogen generator according to the 15th aspect of the present invention, wherein said controlling unit for feed rate performs control so that said oxidation gas and raw material are supplied at the same time at the time of starting the apparatus.

A 23rd aspect of the present invention is the hydrogen generator according to the 21st or the 22nd aspects of the present invention, wherein said controlling unit for feed rate performs control so that the amounts of said raw material and water supplied are increased, and the amount of said oxidation gas supplied is increased.

A 24th aspect of the present invention is the hydrogen generator according to the 23rd aspect of the present invention, wherein control is performed so that the ratio of the increment of the amount of said oxidation gas supplied to the increment of the amount of said raw material supplied is kept at a predetermined level.

A 25th aspect of the present invention is the hydrogen generator according to the 15th aspect of the present invention, comprising temperature detecting means of detecting the temperature of said reforming catalyst, wherein at the time of starting and/or stopping the apparatus, said controlling unit for feed rate operates said oxidation gas supplying unit so that the temperature of said reforming catalyst body does not exceed a second set value of predetermined temperature.

A 26th aspect of the present invention is the hydrogen generator according to the 25th aspect of the present invention, wherein said second set value is defined based on a temperature at which the catalyst reactivity of said reforming catalyst body decreases.

A 27th aspect of the present invention is the hydrogen generator according to the 25th aspect of the present invention, wherein at the time of starting the apparatus, said controlling unit for feed rate operates said oxidation gas supplying unit if the temperature of said reformer exceeds a first set value of predetermined temperature after the supply of said raw material and water is started.

A 28th aspect of the present invention is the hydrogen generator according to the 27th aspect of the present invention, wherein said first set value is defined based on a temperature at which a part of said raw material starts being oxidized with the oxidation gas in said reforming catalyst body.

A 29th aspect of the present invention is the hydrogen generator according to the 15th aspect of the present invention, wherein said controlling unit for feed rate performs control so that said water and said oxidation gas are supplied in amounts at least required for carbon in said raw material to become carbon dioxide.

A 30th aspect of the present invention is the hydrogen generator according to the 15th aspect of the present invention, wherein said controlling unit for feed rate performs control so that the amount of supplied oxidation gas is reduced or the supply of oxidation gas is stopped during rated operation.

A 31st aspect of the present invention is the hydrogen generator according to the 7th or the 15th aspects of the present invention, wherein said reforming catalyst body comprises at least platinum.

A 32nd aspect of the present invention is the hydrogen generator according to the 32nd aspect of the present invention, wherein said reforming catalyst body further comprises a metal oxide.

A 33rd aspect of the present invention is the hydrogen generator according to the 7th or the 15th aspects of the present invention, comprising a desulfurization unit removing a sulfur containing component in said raw material, said desulfurization unit provided between said raw material supplying unit and said reformer, and/or immediately after said reformer, wherein said desulfurization unit is constituted by a desulfurizing agent adsorbing the sulfur component.

A 34th aspect of the present invention is the hydrogen generator according to the 1st, the 7th or the 15th aspects of the present invention, comprising a carbon monoxide removing unit reducing the content of carbon monoxide contained in hydrogen gas supplied from said reformer.

A 35th aspect of the present invention is the hydrogen generator according to the 34th aspect of the present invention, wherein said carbon monoxide removing unit comprises a shifter making carbon monoxide and steam undergo a shift reaction.

A 36th aspect of the present invention is the hydrogen generator according to the 35th aspect of the present invention, wherein said shifter comprises a transformation catalyst containing copper and zinc.

A 37th aspect of the present invention is the hydrogen generator according to the 36th aspect of the present invention, comprising a selection oxidation temperature measuring unit provided in the downstream of the flow of said hydrogen gas in said selection oxidation unit, and comparison means of comparing the temperature measured by said selection oxidation temperature measuring unit with a predetermined value, wherein a temperature equal to or lower than said reference value indicates that the content of sulfur component contained in said hydrogen gas after said selection oxidation unit increases.

A 38th aspect of the present invention is the hydrogen generator according to the 35th aspect of the present invention, wherein said shifter has a transformation catalyst containing platinum and a metal oxide.

A 39th aspect of the present invention is the hydrogen generator according to the 1st, the 7th, the 15th or the 35th aspects of the present invention, wherein said carbon monoxide removing unit comprises at least a selection oxidation unit oxidizing carbon monoxide in the hydrogen gas by an oxidation catalyst.

A 40th aspect of the present invention is the hydrogen generator according to the 39th aspect of the present invention, wherein said selection oxidation unit has a catalyst containing platinum and ruthenium.

A 41st aspect of the present invention is the hydrogen generator according to the 39th aspect of the present invention, wherein said shifter has a catalyst containing platinum and a metal oxide.

A 42nd aspect of the present invention is a fuel cell system comprising:

the hydrogen generator according to any one of the 1st to the 41st aspects of the present inventions; and a fuel cell operating under the supply of said hydrogen gas from said hydrogen generator.

A 43rd aspect of the present invention is the fuel cell system according to the 42nd aspect of the present invention, wherein a gas discharged from said hydrogen generator is introduced into said fuel cell during a predetermined time period while the system is started and/or the system is stopped.

A 44th aspect of the present invention is the fuel cell system according to the 43rd aspect of the present invention, comprising cell temperature detecting means of detecting the operation temperature of said fuel cell, wherein said controlling unit for feed rate of said hydrogen generator performs control so that water is supplied in an amount such that the temperature detected by said cell temperature detecting temperature is equal to or lower than a predetermined steam dew point of said discharged gas at the time of starting and/or stopping the system.

A 45th aspect of the present invention is the fuel cell system according to the 43rd aspect of the present invention, wherein said controlling unit for feed rate of said hydrogen generator performs control so that said oxidation gas is supplied in an amount equal to or larger than the theoretical amount of oxygen for completely oxidizing said raw material during a predetermined time period while the system is started and/or the system is stopped.

A 46th aspect of the present invention is a method of controlling a hydrogen generator in which the supply of raw material, water and oxidation gas is controlled in a hydrogen generator comprising:

a reformer producing hydrogen gas, said reformer provided with a reforming catalyst body making said raw material react with said water;

a raw material supplying unit supplying said raw material to said reformer;

a water supplying unit supplying said water to said reformer; and an oxidation gas supplying unit supplying said oxidation gas containing at least oxygen to said reforming catalyst body, wherein the amount of oxidation gas to be supplied from said oxidation gas supplying unit to said reforming catalyst body is defined based on the content of sulfur component contained in said raw material.

A 47th aspect of the present invention is a method of controlling a hydrogen generator in which the supply of raw material, water and oxidation gas is controlled in a hydrogen generator comprising:

a reformer producing hydrogen gas, said reformer provided with a reforming catalyst body making said raw material react with said water;

a raw material supplying unit supplying said raw material to said reformer;

a water supplying unit supplying said water to said reformer; and an oxidation gas supplying unit supplying said oxidation gas containing at least oxygen to said reforming catalyst body, wherein the supply of said raw material, said water and said oxidation gas is controlled at the time of starting and/or stopping the apparatus.

A 48th aspect of the present invention is a program of making a computer function as the whole or part of the controlling unit for feed rate controlling the supply of said raw material, said water and said oxidation gas in the hydrogen generator according to the 7th aspect of the present invention.

A 49th aspect of the present invention is a program of making a computer function as the whole or part of the controlling unit for feed rate controlling the supply of said raw material, said water and said oxidation gas at the time of starting and/or stopping the apparatus in the hydrogen generator according to the 15th aspect of the present invention.

A 50th aspect of the present invention is a medium storing the program according to the 48th aspect of the present invention, said medium capable of being processed by a computer.

A 51st aspect of the present invention is a medium storing the program according to the 49th aspect of the present invention, said medium capable of being processed by a computer.

According to the present invention, an apparatus using a reforming catalyst having relatively high resistance to a sulfur containing component contained in a raw material, and an apparatus capable of easily removing a sulfur component in the raw material are provided to solve problems associated with the conventional hydrogen generator.

BRIEF DESCRIPTION OF THE DRAWINGS

FIG. 3(A) shows an influence of a high concentration sulfur component;

FIG. 3(B) shows an influence of a low concentration sulfur component;

Figure 1:
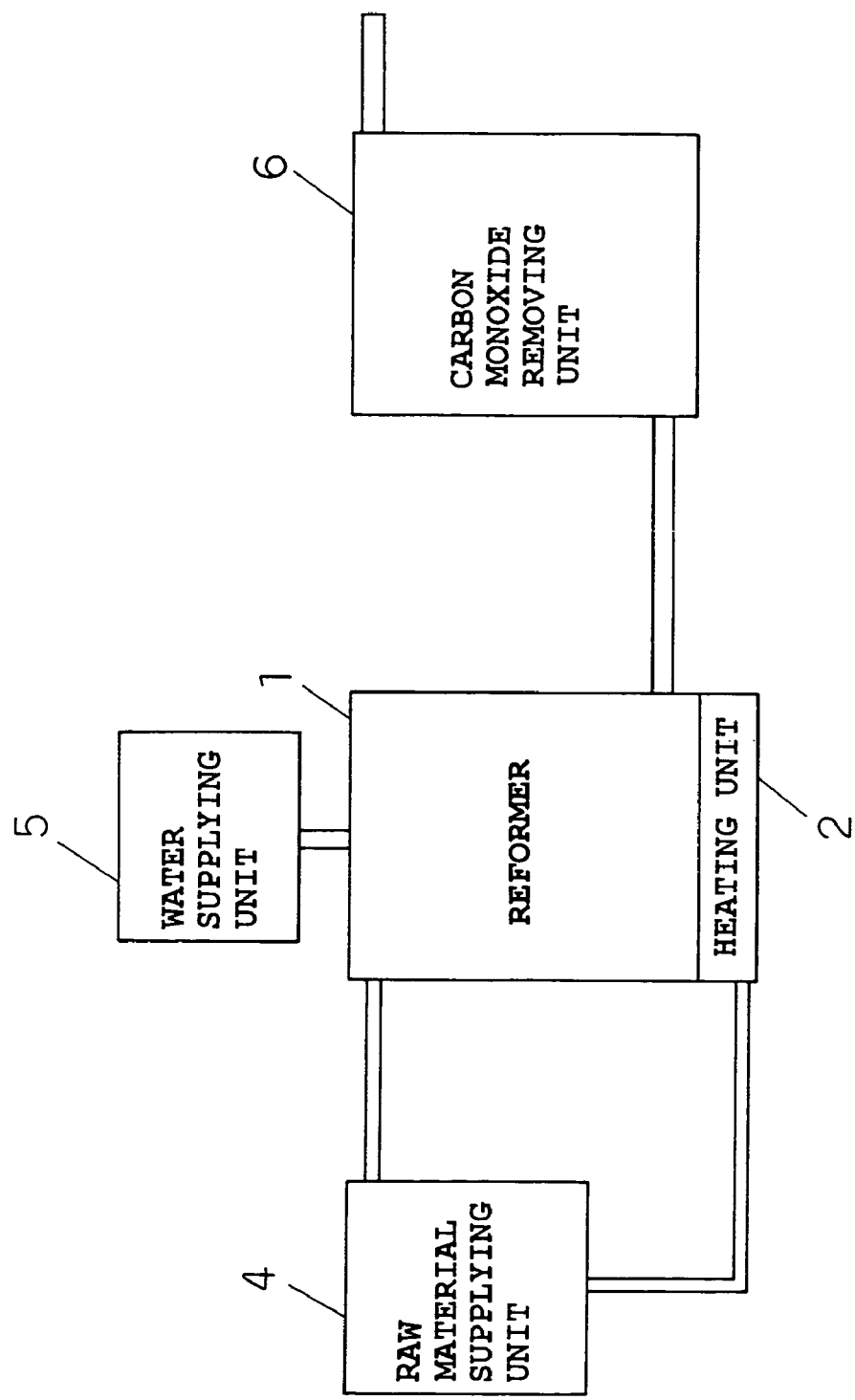
FIG. 1 is a block diagram of a hydrogen generator in Embodiment 1 of the present invention.

DESCRIPTION OF THE SYMBOLS 1 reformer
1a preheating unit
1b reforming catalyst unit
1c reforming catalyst
1d first reforming catalyst
1e desulfurization unit in reformer
1f first reforming catalyst
2 heating unit
3 reforming temperature measuring unit
3a first reforming temperature measuring unit
3b second reforming temperature measuring unit
4 raw material supplying unit
5 water supplying unit
6 carbon monoxide removing unit
7 post-reforming desulfurization unit
8 pre-reforming desulfurization unit
21 reformer
21a preheating unit
21b reforming catalyst unit
21c reforming catalyst
22 heating unit
23 reforming temperature measuring unit
24 raw material supplying unit
25 desulfurization unit
26 reforming air supplying unit
27 water supplying unit
28 controlling unit for feed rate
29 shifter
29b transformation first temperature measuring unit
29c transformation second temperature measuring unit
210 purification air supplying unit
211 purification unit
211b purification first temperature measuring unit 211c purification second temperature measuring unit
212 logger
213 post-reforming desulfurization unit
31 reformer
31a preheating unit
31b reforming catalyst unit
32 heating unit
33 reforming temperature measuring unit
34 raw material supplying unit
35 desulfurization unit
36 reforming air supplying unit
37 water supplying unit
38 controlling unit for feed rate
39 shifter
311 purification unit
312 fuel cell power generation unit

BEST MODE FOR CARRYING OUT THE INVENTION

Embodiments of the present invention will be described below with reference to the drawings.

(Embodiment 1)

Figure 2:
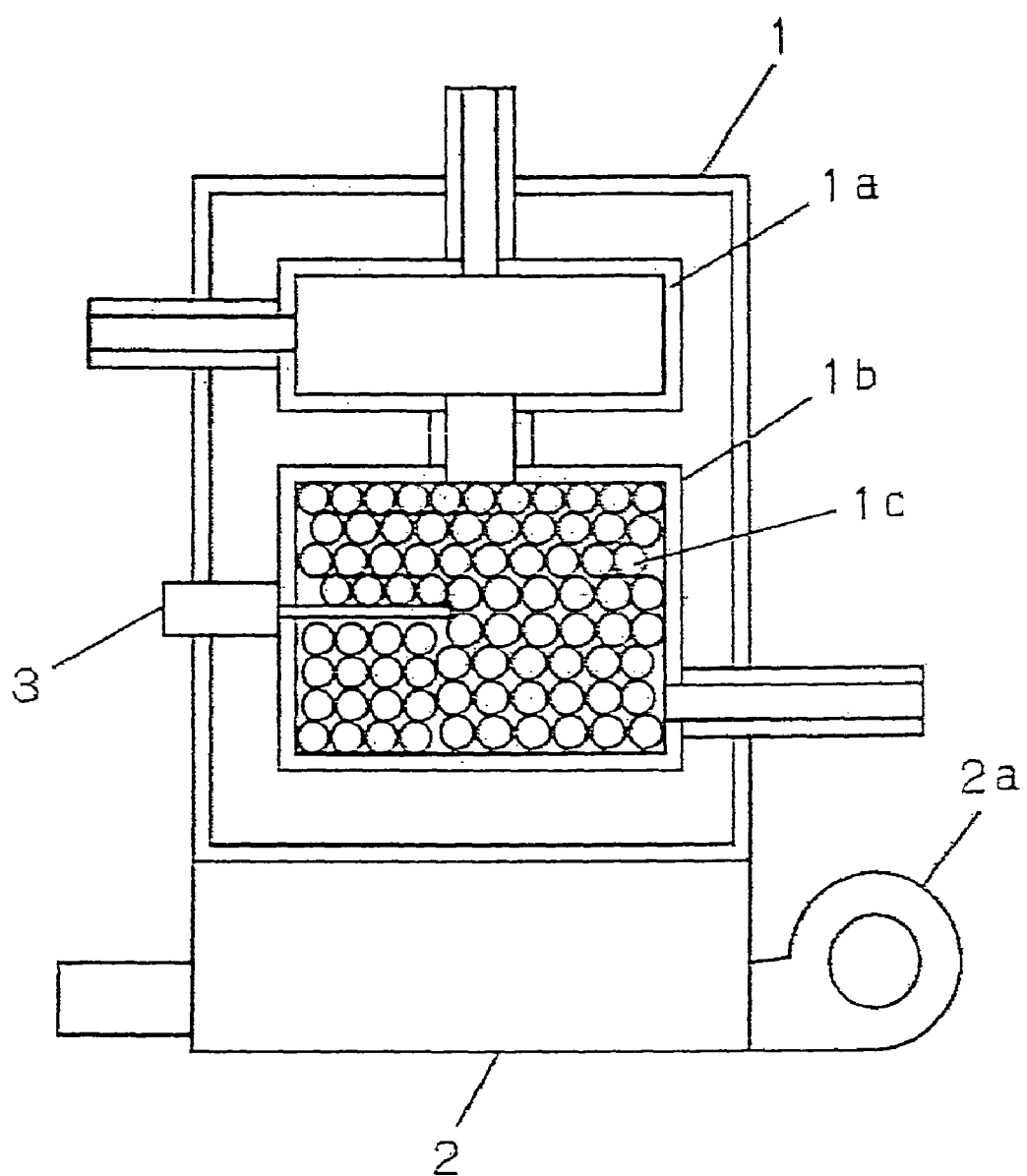
FIG. 2 is a detailed block diagram of a reformer.

FIG. 1 is a block diagram of a hydrogen generator in Embodiment 1 of the present invention. In FIG. 1, reference numeral 1 denotes a reformer making a reforming reaction between a raw material such as a hydrocarbon component such as natural gas and LPG, an alcohol such as methanol or a naphtha component and steam progress. In addition, the details of the reformer 1 are shown in FIG. 2. In FIG. 2, reference numeral 1a denotes a preheating unit for the raw material and water, and reference numeral 1b denotes a reforming catalyst unit. Reference numeral 1c denotes a reforming catalyst prepared by having platinum carried on a metal oxide and making an adjustment thereto to provide an alumina pellet-shaped material. Furthermore, in this embodiment, a Zr oxide is used as a metal oxide. In addition, reference numeral 2 denotes a heating unit of the reformer 1, which supplies heat required for a reforming reaction. The heating unit is a flame burner to burn a gas returned from a hydrogen gas supplying source, and comprises a sirocco fan 2a for supplying combustion air (not shown in detail). Reference numeral 3 denotes a reforming temperature measuring unit to measure the temperature inside the reforming catalyst 1c. Reference numeral 4 denotes a raw material supplying unit supplying a raw material such as a hydrocarbon component such as natural gas and LPG, an alcohol such as methanol or a naphtha component to the reformer 1. In this embodiment, natural gas supplied as a fuel infrastructure is used, and a booster which increases the supply pressure of natural gas is provided. Reference numeral 5 denotes a water supplying unit supplying water required for the reforming reaction to the reformer 1, in which ion-exchanged water is supplied using a plunger pump. Reference numeral 6 denotes a carbon monoxide removing unit to reduce the content of carbon monoxide in a hydrogen gas after the reformer 1, which is constituted by a shifter mainly causing a shift reaction between carbon monoxide and steam, and a purification unit making carbon monoxide undergo oxidation selectively (not shown in detail). Hydrogen gas after the carbon monoxide removing unit 6 is supplied to and used in, for example, a power generation system using a fuel cell requiring hydrogen, or an ammonium synthesis system.

Normal apparatus operations in this hydrogen generator will be described below.

First, natural gas as a raw material is supplied from the raw material supplying unit 4 to the reformer 1. Meanwhile, water required for reform reaction is supplied through water supply unit 5. The amount of water supplied is approximately three times as large as the number of carbon atoms in the natural gas. The raw material and water supplied to the reformer 1 are heated in the preheating unit 1a, and are thereafter fed to the reforming catalyst unit 1b. In the reforming catalyst unit 1b, the reforming reaction is made to proceed on the reforming catalyst 1c. At this time, a part of natural gas is burned in the heating unit 2 to supply an amount of heat required for the reforming reaction. About 10% of carbon monoxide and carbon dioxide (dry gas base) is contained in the hydrogen gas after the reformer 1. Then, this hydrogen gas is supplied to the carbon monoxide removing unit 6. In the carbon monoxide removing unit 6, a shift reaction between carbon monoxide and water is carried out at the shifter, and an oxidation reaction between carbon monoxide and oxygen is carried out at the purification unit to reduce the content of carbon monoxide to a level necessary for a system to which the hydrogen gas is supplied. If the hydrogen gas is supplied to a polymer electrolyte fuel cell, for example, the content of carbon monoxide is reduced to about 20 ppm.

According to the present invention, the content of carbon monoxide is effectively reduced to supply the hydrogen gas efficiently by the above described operations. However, the raw material such as a hydrocarbon component such as natural gas and LPG, an alcohol such as methanol, or a naphtha component contains a sulfur containing component such as an odorant component of urban gas, for example, or a sulfur component existing originally in crude oil or the like. The sulfur component is a poisoning component, which can cause a decrease in catalytic activity for many catalysts. The same goes for the reforming catalyst for use in steam reforming. In particular, Ru based reforming catalysts that are generally used are easily poisoned even with a very small amount of sulfur component, thus making it impossible to stably supply the hydrogen gas. Thus, in the conventional hydrogen generator, the sulfur component in the raw material is removed before the raw material is used in the reforming reaction, thereby dealing with the problem. However, it is impossible to fully remove the sulfur component. For example, the zeolite absorbent used in this Embodiment is capable of reducing the content of sulfur containing component in the raw material to at most one hundred-millionth (10 ppb) or smaller of the total mole number of molecules of the raw material. As a result, the Ru based reforming catalyst finally suffers a decrease in catalytic activity due to the remaining sulfur component.

In the present invention, to solve the above problem, the reforming catalyst is constituted by a carrier composed of platinum and a metal oxide. The platinum catalyst has relatively high resistance to sulfur. However, it has a disadvantage that carbon is precipitated easily compared to other catalysts. This tendency is significant particularly in the steam reforming reaction proceeding under a reduced condition.

Thus, in the present invention, a metal oxide is used as a catalyst carrier to provide a capability of supplying oxygen from the carrier to the catalyst, whereby precipitation of carbon is prevented. Since the capability of supplying oxygen from carrier to the catalyst includes a capability of preventing the sulfur component from being accumulated on the catalyst at the same time, a decrease in catalytic activity due to the existence of the sulfur component in the platinum catalyst is prevented. Furthermore, a Zr oxide is used as a carrier with which the platinum catalyst is combined in this embodiment, but other oxides, for example oxides of Ce, Al, Mg and Mn, or composite oxides of these metals and Zr may be used to obtain a similar effect as long as they have the capability of supplying oxygen from the carrier to the catalyst.

One Example of studying the above effects in this embodiment will be described. Natural gas (main component: methane) was used as a raw material, and water was supplied to the reformer 1 so that the amount of water was three times as large as the number of carbon atoms. For comparison of reforming catalysts, an Ni based catalyst carried on an alumina carrier, an Ru based catalyst carried on an alumina carrier and a platinum catalyst carried on a Zr oxide carrier were used. For examining the influence of a high concentration sulfur component, the variation in catalytic activity where a raw material with hydrogen sulfide added thereto in the concentration of 5 ppm with respect to the raw material as a sulfur component in the raw material was directly supplied to the catalyst was measured. In addition, for examining the influence of a low concentration sulfur component, the variation in catalytic activity where the raw material was passed through a desulfurization unit using zeolite to reduce the content of hydrogen sulfide to $1/1000$ of the original content was measured.

Figure 3:
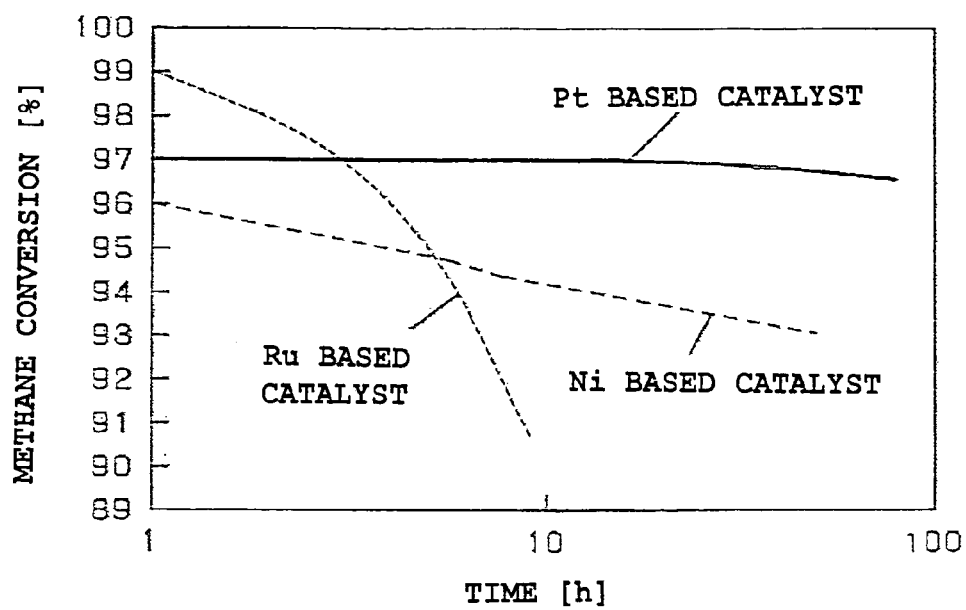
FIG. 3 shows a variation with time of methane conversion rate of a reforming catalyst.
Figure 3:
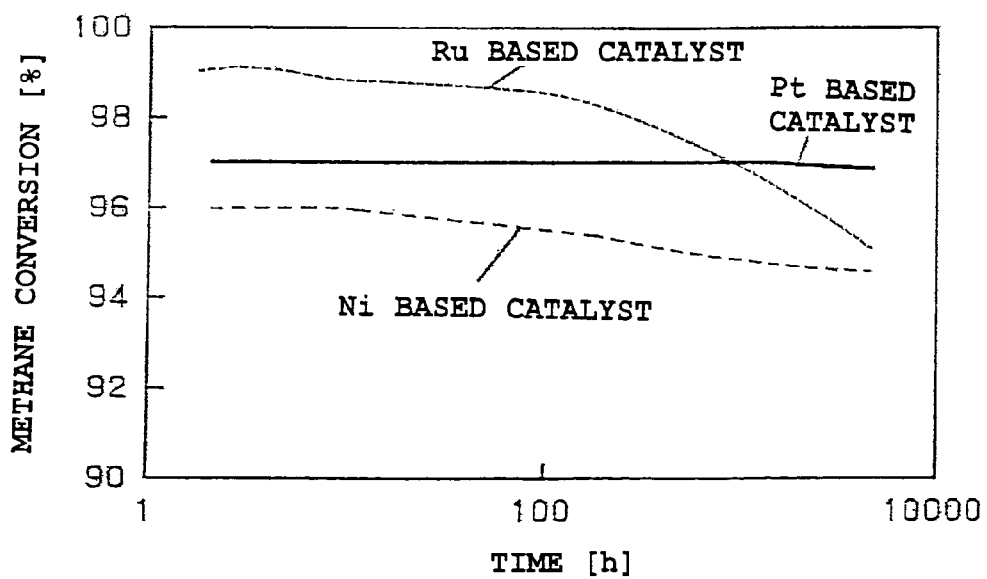

The influence of the high concentration sulfur component is shown in FIG. 3(A), and one Example of measuring the influence of the low concentration sulfur component is shown in FIG. 3(B). From FIG. 3(A), the Ru based and Ni based catalysts show a drop in methane conversion rate indicating the catalyst reactivity in steam reforming when they are exposed to a relatively high concentration sulfur component. On the other hand, it can be understood that for the platinum catalyst according to the present invention, a decrease in catalyst reactivity can be prevented. In addition, from FIG. 3(B), the Ru based catalyst shows a drop in methane conversion rate indicating the catalyst reactivity in steam reforming due to the remaining sulfur component when it is used for a long time even in the case where the sulfur component is removed with the desulfurization unit using zeolite, while there is little decrease in catalyst reactivity of the platinum catalyst. The Ni based catalyst shows a level of decrease in reactivity at some midpoint between those of the Ru based catalyst and the platinum based catalyst. From the above results, it can be understood that the reforming catalyst with a platinum catalyst carried on a Zr oxide carrier has higher resistance to sulfur than the Ru based catalyst that has been traditionally used.

In addition, by having platinum carried on the metal oxide, oxygen is supplied from the metal oxide to alleviate the problem of carbon precipitation on the catalyst. A comparison was made between a single platinum catalyst and a platinum catalyst combined with a Zr oxide when natural gas (main component: methane) was used as a raw material, and water was supplied to the reformer so that the amount of water was three times as large as the number of carbon atoms in the raw material. After the catalysts were used for 100 hours, carbon precipitation on the catalyst was observed for the single platinum catalyst while no carbon precipitation was observed for the platinum catalyst combined with the Zr oxide. In addition, similar effects were obtained for oxides of some metals such as Ce, Al, Mg and Mn or composite oxides of these metals and Zr.

Furthermore, the reforming catalyst prepared by having platinum carried on the metal oxide and making an adjustment thereto cannot retain a catalytic activity for a long time in the presence of high concentration sulfur component. It is therefore desirable that the raw material to be supplied has originally a small amount of sulfur component.

(Embodiment 2)

Figure 4:
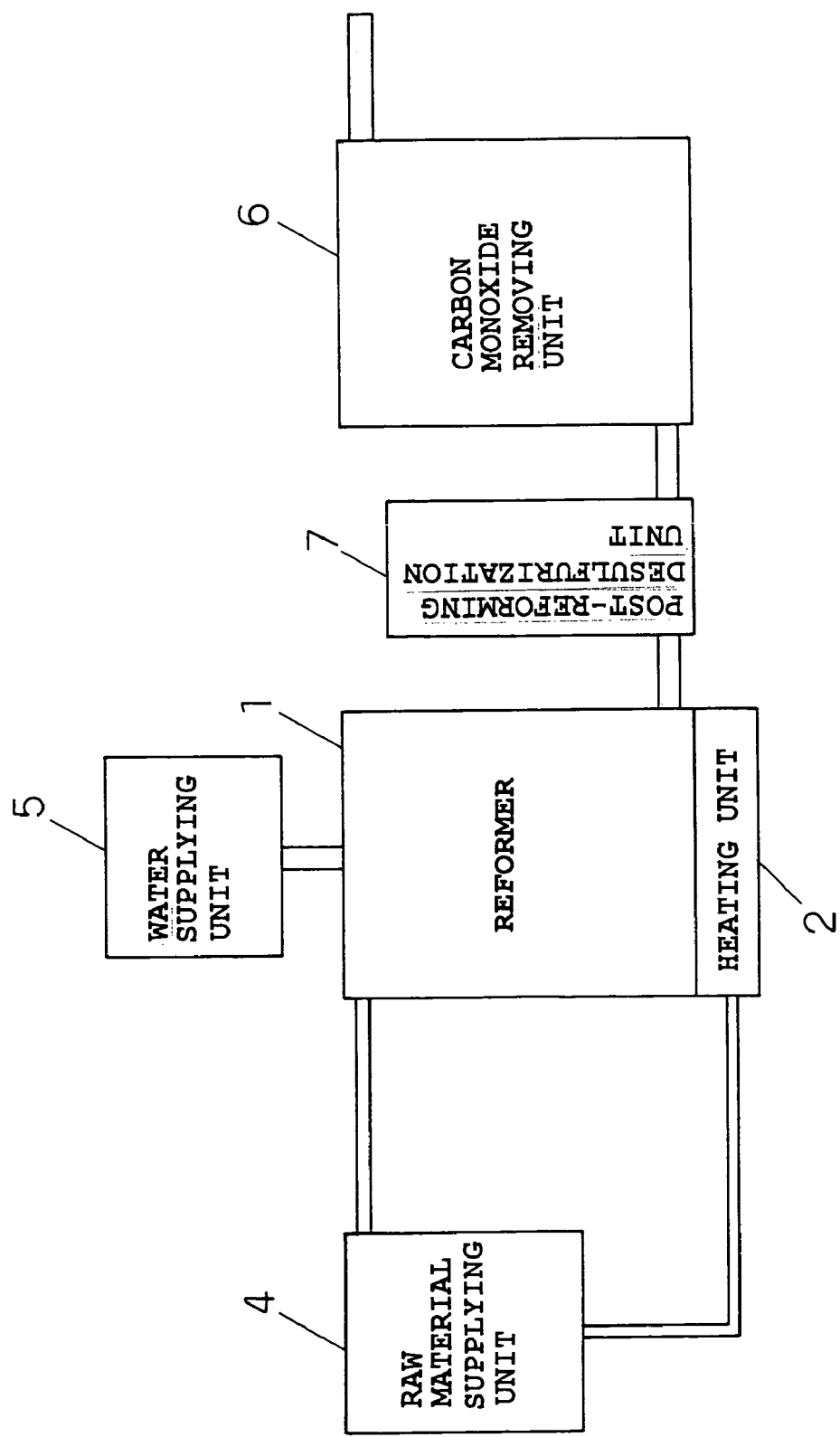
FIG. 4 is a block diagram of the hydrogen generator in Embodiment 2 of the present invention.

Embodiment 2 of the present invention will now be described. FIG. 4 is a block diagram of the hydrogen generator in Embodiment 2 of the present invention. The apparatus used in Embodiment 2 has a configuration almost identical to that of the apparatus shown in Embodiment 1, and therefore detailed descriptions thereof are not presented here. The apparatus of this Embodiment differs from that of Embodiment 1 in that a post-reforming desulfurization unit 7 to reduce the content of sulfur component after the reformer 1 is provided, and in this embodiment, a zinc oxide desulfurizing agent is used for removing hydrogen sulfide in the hydrogen gas.

Apparatus operations are also similar to those of Embodiment 1, and therefore detailed descriptions thereof are not presented here, and only a different point is described. The different point is that the hydrogen sulfide component in the hydrogen gas after the reformer 1 is removed with the zinc oxide desulfurizing agent.

An organic compound as a raw material contains a more or less sulfur component. The Ru based catalyst and the Ni based catalyst that have been widely used suffer a decrease in catalytic activity due to the existence of the sulfur component. The reforming catalyst with platinum carried on a metal oxide according to the present invention has relatively high resistance to the sulfur component and a level of decrease in catalytic activity of the catalyst is relatively low even when the raw material is directly used. However, the sulfur component in the raw material is not removed with the reforming catalyst, but is contained as a residual component in the hydrogen gas after the reformer 1. In the case where the hydrogen gas is supplied to a power generation system using a fuel cell requiring hydrogen, or an ammonium synthesis system, it is desirable that the sulfur component is removed in advance. This is because the sulfur component is a poisoning component which can cause a decrease in catalytic activity for many catalysts.

Thus, in this embodiment, the post-desulfurization unit 7 using the zinc oxide desulfurizing agent is provided to reduce the content of sulfur component after the reformer 1. Furthermore, the sulfur component after reformer 1 reacts with hydrogen on the reforming catalyst of the present invention to form hydrogen sulfide, which is contained in the hydrogen gas, without using a catalyst for hydrogenation. Thus, by using zinc oxide as in this embodiment, the zinc oxide is made to react with hydrogen sulfide to form zinc sulfide, which can be removed. In this way, a decrease in catalytic activity other than the reforming catalyst can be prevented.

(Embodiment 3)

Figure 5:
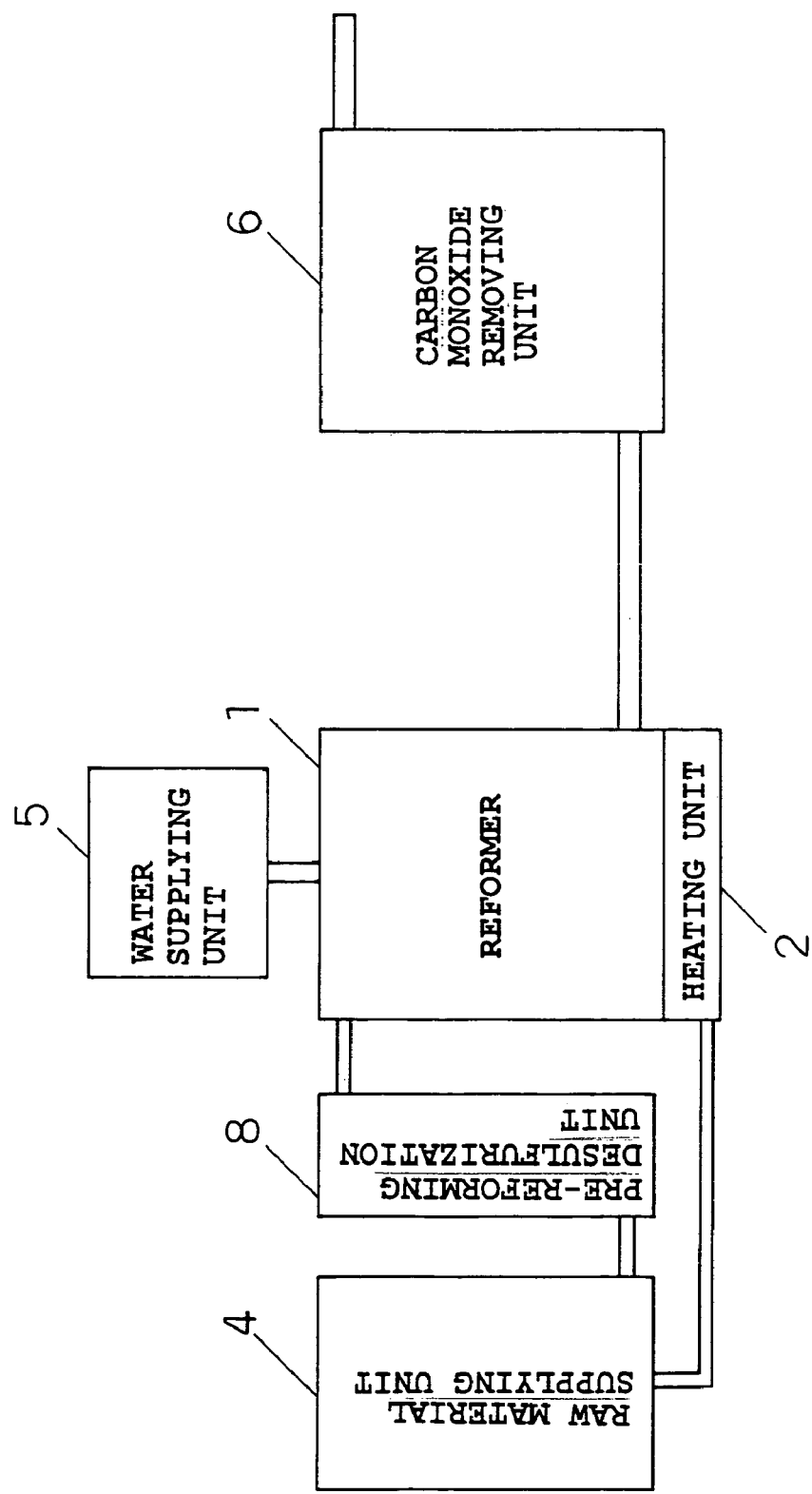
FIG. 5 is a block diagram of the hydrogen generator in Embodiment 3 of the present invention.

Embodiment 3 of the present invention will now be described. FIG. 5 is a block diagram of the hydrogen generator in Embodiment 3. The apparatus used in Embodiment 3 has a configuration almost identical to that of the apparatus shown in Embodiment 1, and therefore detailed descriptions thereof are not presented here. The apparatus of this Embodiment differs from that of Embodiment 1 in that a pre-reforming desulfurization unit 8 to reduce the content of sulfur component in the raw material is provided, and in this embodiment, a zeolite absorbent agent is used for removing an odorant component in natural gas.

Apparatus operations are also similar to those of Embodiment 1, and therefore detailed descriptions thereof are not presented here, and only a different point is described. The different point is that the sulfur component in the raw material before the reformer 1 is removed to some extent in the pre-reforming desulfurization unit 8.

The reforming catalyst prepared by having platinum carried on the metal oxide and making an adjustment thereto cannot retain a catalytic activity permanently in the presence of high concentration sulfur component. Thus, with prolonged lifetime in view, it is desirable that the content of sulfur component in the raw material to be supplied is reduced in advance. In one Example shown in FIG. 3(B), the content of sulfur component in the raw material to be supplied is reduced in advance, whereby the reforming catalyst prepared by having platinum carried on a metal oxide and making an adjustment thereto can retain catalyst reactivity. That is, as in this Embodiment, the reforming catalyst with platinum carried on a metal oxide with the sulfur component in the raw material being adsorbed by zeolite and removed can retain a catalytic activity for a long time.

Furthermore, even if the capability of removing sulfur by the pre-reforming desulfurization unit 8 is compromised and thus the concentration of sulfur component in the raw material is increased, the reforming catalyst prepared by having platinum carried on a metal oxide and making an adjustment thereto has a particular capability of preventing a decrease in catalytic reactivity because it has higher resistance to sulfur than the Ru based and Ni based catalysts that have been traditionally used, as a matter of course.

(Embodiment 4)

Figure 6:
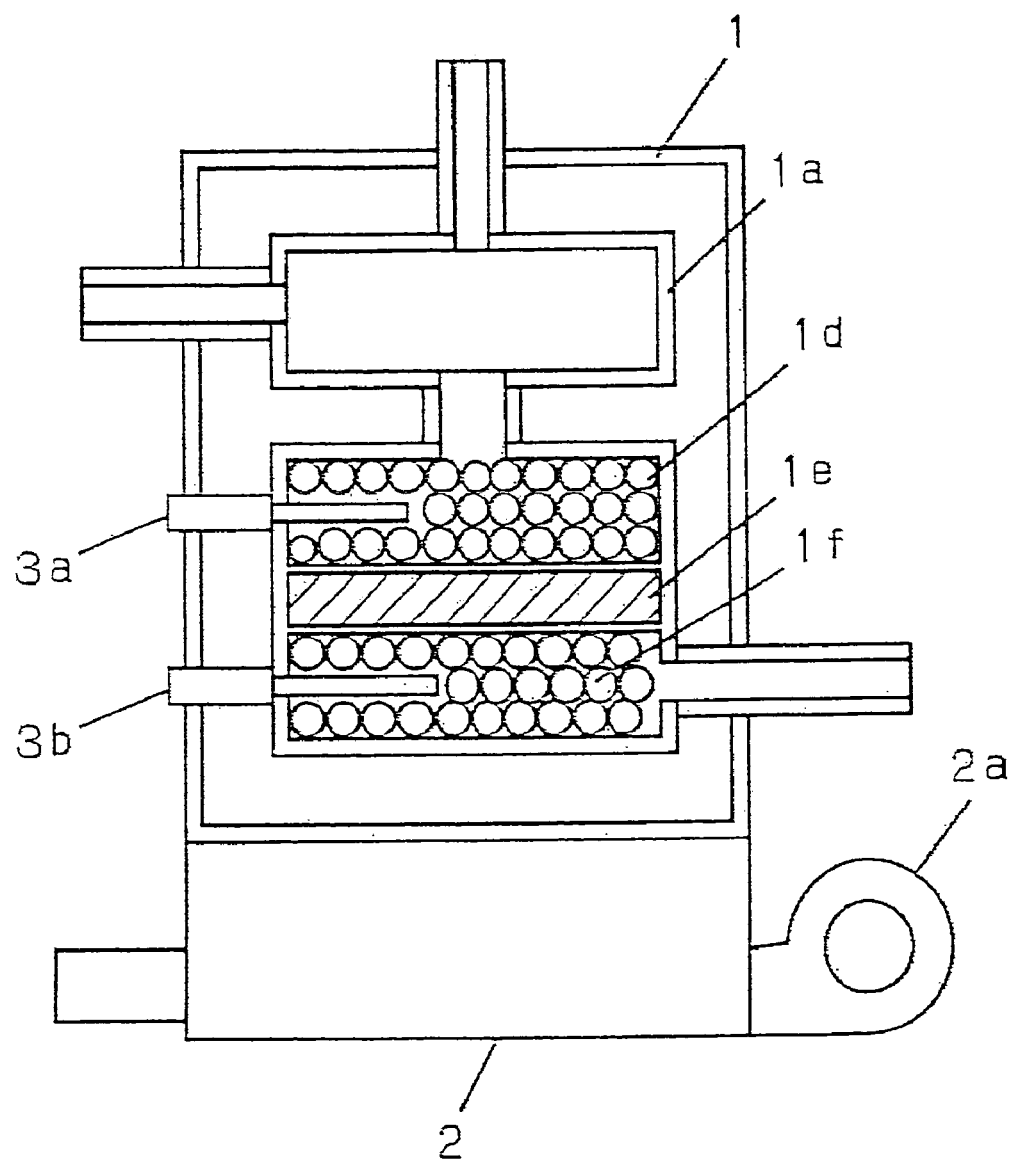
FIG. 6 is a block diagram of the hydrogen generator in Embodiment 4 of the present invention.

Embodiment 4 of the present invention will now be described. FIG. 6 is a sectional view of main portions of the reformer 1 in Embodiment 4 of the present invention. The apparatus used in Embodiment 4 has a configuration almost identical to that of the apparatus shown in Embodiment 1, and therefore detailed descriptions thereof are not presented here. The apparatus of this Embodiment differs from that of Embodiment 1 in that in FIG. 6, the reforming catalyst unit 1*b* has a two-stage structure constituted by a first reforming catalyst body 1*d* provided closer to the preheating unit 1*a* and a second reforming catalyst body provided with a predetermined space between itself and the first catalyst body 1*d* and closer to the outlet of the reformer 1, and a desulfurization unit in reformer 1*e* is provided so that the predetermined space between the first reforming catalyst body 1*d* and the second reforming catalyst body 1*f* is filled, and that a first reforming catalyst temperature measuring unit 3*a* and a second reforming catalyst temperature measuring unit 3*b* are provided for measuring the temperatures of the first reforming catalyst body 1*d* and the second reforming catalyst body 1*f*, respectively. Furthermore, a catalyst with a platinum catalyst carried on a Zr oxide carrier is used as a reforming catalyst, and a zinc oxide desulfurizing agent is used as a desulfurizing agent of the desulfurization unit in reformer 1*e*. In addition, the first reforming catalyst body 1*d* and the second reforming catalyst body 1*f* are equivalent to sub-reforming catalysts of the present invention, and the desulfurization unit in reformer 1*e* is equivalent to a hydrogen sulfide removing body of the present invention.

Apparatus operations are also similar to those of Embodiment 2, and therefore detailed descriptions thereof are not presented here, and only a different point is described. The different point is that hydrogen sulfide generated in the first reforming catalyst body 1*d* is removed in the desulfurization unit in reformer 1*e* provided in the reformer 1.

In the case where an organic compound as a raw material contains a sulfur component, the sulfur component in the raw material can be removed in advance to some extent in the pre-reforming desulfurization unit 8 as in Embodiment 3. If the raw material is a gas, the sulfur component can easily be removed to some extent using an adsorbent desulfurizing agent. If the raw material is a liquid, the sulfur component cannot be removed easily by absorption, and therefore the hydro-desulfurization method is often used in which hydrogen is added to the raw material, and the sulfur component is made to react with hydrogen sulfide using a catalyst for hydrogenation (such as an Mo based catalyst), and is removed with an absorbent such as zinc oxide. The hydro-desulfurization method causes the configuration of the desulfurization unit to be complicated due to the fact that hydrogen should be added to the raw material in advance, the catalyst must be heated at a relatively high temperature, and so on.

On the other hand, when the sulfur component in the raw material is supplied to the reformer 1 without being treated, the sulfur component reacts with hydrogen produced by the steam reforming reaction on the reforming catalyst to form hydrogen sulfide as shown in Embodiment 2. The hydrogen sulfide may also be removed in the post-reforming desulfurization unit 7 provided after the reformer 1. This method enables the sulfur component to be removed easily. However, even the reforming catalyst with platinum carried on a metal oxide in the present invention cannot always retain a catalytic activity for a long time in the presence of high concentration sulfur component.

Thus, in this Embodiment, for removing hydrogen sulfide generated on the reforming catalyst in the reformer to make the steam reforming reaction proceed effectively, the sulfur component in the raw material is converted into hydrogen sulfide in the first reforming catalyst body 1*d*, and subsequently the hydrogen sulfide is removed in the desulfurization unit in reformer 1*e*, after which the raw material with hydrogen sulfide removed therefrom is further passed through the second reforming catalyst body 1*f* to promote the steam reforming reaction.

If the temperature of the reforming catalyst is 200° C. or higher, the steam reforming reaction proceeds to produce hydrogen although the amount of hydrogen is very small. Also, if hydrogen exists, the sulfur component in the raw material undergoes a reaction to form hydrogen sulfide at a temperature of 200° C. In the invention shown in this Embodiment, this reaction is made to proceed in the first reforming catalyst body 1*d*. By making a hydro-reaction proceed using internally produced hydrogen, the configuration can significantly be simplified compared with the conventional hydro-desulfurization method in which hydrogen is added to the raw material.

The generated hydrogen sulfide is removed with the zinc oxide desulfurizing agent provided in the desulfurization unit in reformer 1*e*. The zinc oxide desulfurizing agent is not capable of removing hydrogen sulfide at a high temperature, but a temperature as high as 400° C. is required as an upper limit to effectively operate the desulfurization unit in reformer 1*e*, and thus this temperature affects the temperature of the desulfurization unit in reformer 1*e*.

Then, in the case where hydrogen sulfide is removed using the zinc oxide desulfurizing agent, it is desirable that the first reforming catalyst body id located in the upstream of the flow of the raw material is operated at a temperature in the range of from 200° C. to 400° C. Furthermore, this temperature range should be determined in accordance with conditions of use of the apparatus. For example, the temperature at which production of hydrogen is started varies depending on the combination of types and quantity of metal oxide of reforming catalysts and raw material to be supplied, and the upper limit of temperature at which the sulfur component is detached also varies depending on the type of desulfurizing agent. In addition, if the temperature at which removal of hydrogen sulfide by the desulfurizing agent is started (hereinafter referred to as removal start temperature) is higher than the temperature at which the reforming catalyst causes hydrogen to be produced, it is desirable that this removal start temperature is the lower limit of temperature at which the reforming catalyst can be used.

In this way, in consideration of the type and quantity of metal oxide of the reforming catalyst to be used and the desulfurizing agent and the type and quantity of material gas, a range optimally fit for these conditions is desirably set for the temperature range of the first reforming catalyst body 1d. However, this does not apply in cases where the temperature of the desulfurization unit in reformer 1e can be controlled, e.g. a temperature controlling capability is provided after the first reforming catalyst body 1d.

Then, the gas after the desulfurization unit in reformer 1e undergoes a further proceeding steam reforming reaction in the second reforming catalyst body 1f. A gas with the sulfur component removed to some extent is fed to the second reforming catalyst body 1f, and therefore the catalyst body can retain catalyst reactivity for a long time. Furthermore, as described previously, when operated at a temperature in the range of from 200 to 400° C., the first reforming catalyst body 1d exhibits a capability of producing hydrogen and retaining reactivity of the sulfur component into hydrogen sulfide because the catalyst reactivity is not significantly decreased by the sulfur component.

Furthermore, in the above description, the reforming catalyst body has a two-stage structure constituted by the first reforming catalyst body 1d and the second reforming catalyst body 1f, and the desulfurization unit in reformer 1e is provided between those reforming catalyst bodies, but the sub-reforming catalyst body of the present invention may have a three or more stage structure, and the desulfurization unit in reformer may be provided for each space between those reforming catalyst bodies. In short, a plurality of sub-reforming catalyst bodies of the present invention may be provided at predetermined intervals from the upstream to the downstream of the flow of the raw material, and the hydrogen sulfide removing body in each predetermined space between the sub-reforming catalyst bodies. For example, when the reforming catalyst body has a three-stage structure, the desulfurization unit in reformer has a two-stage structure.

Also, similar effects can be obtained by achieving a configuration such that the carrier of the reforming catalyst body located in the upstream of the raw material flow has a desulfurization capability, or the desulfurization unit in reformer is provided in the midstream of the reforming catalyst body instead of providing individually the first reforming catalyst body 1d, the desulfurization unit in reformer 1e and the second reforming catalyst body 1f as in this Embodiment.

(Embodiment 5)

Figure 7:
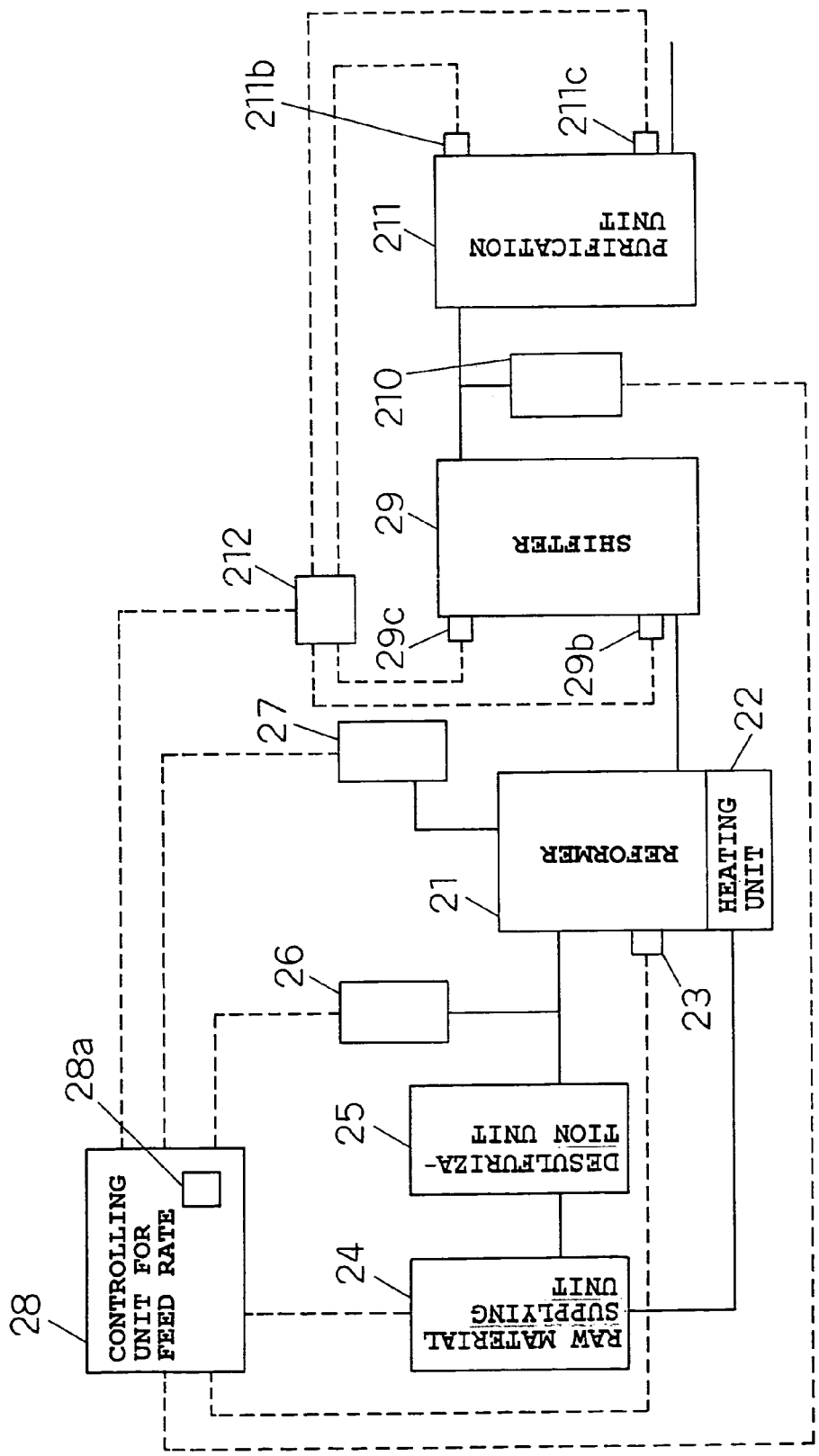
FIG. 7 is a block diagram of the hydrogen generator in Embodiment 5 of the present invention.
Figure 8:
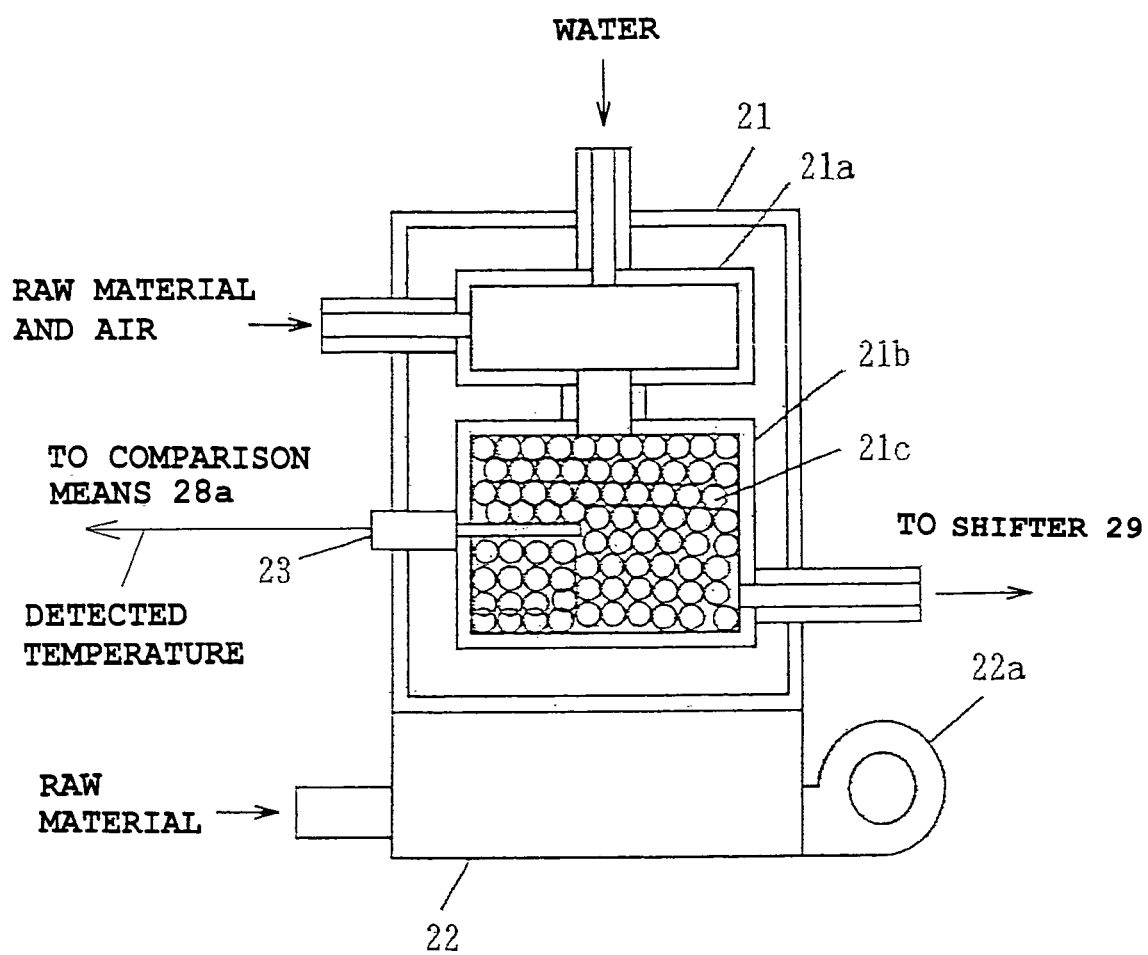
FIG. 8 is a detailed block diagram of the reformer.

FIG. 7 is a block diagram of the hydrogen generator in Embodiment 5 of the present invention. In FIG. 7, reference numeral 21 denotes a reformer mainly making a reforming reaction between a raw material such as a hydrocarbon component such as natural gas and LPG, an alcohol such as methanol or a naphtha component and steam progress. In addition, the details of the reformer 21 are shown in FIG. 8. In FIG. 8, reference numeral 21a denotes a preheating unit heating a raw material, water and air, and reference numeral 21b denotes a reforming catalyst unit. Reference numeral 21c denotes a reforming catalyst prepared by having platinum carried on a metal oxide and making an adjustment thereto.

In FIG. 7, reference numeral 22 denotes a heating unit of the reformer 21, which serves as means of supplying heat required for the reforming reaction, and is realized as a flame burner to burn a part of raw material or burn a gas returned from a hydrogen gas supplying source. A sirocco fan 23a is provided for supplying combustion air (not shown in detail). Reference numeral 23 denotes a reforming temperature measuring unit to measure the temperature in the reforming catalyst 1c. Reference numeral 24 denotes a raw material supplying unit to supply to the reformer 21 a hydrocarbon component such as natural gas and LPG, an alcohol such as methane and a naphtha component as a raw material. In this Embodiment, natural gas supplied as a fuel infrastructure is used, and a booster which increases the supply pressure of natural gas is provided. Reference numeral 25 is a desulfurization unit reducing the content of sulfur component in the raw material, and in this embodiment, a zeolite absorbent is used for removing odorant components in natural gas. Reference numeral 26 denotes a reforming air supplying unit supplying air as an oxidation gas to the raw material, and is realized as an air pump for example. Furthermore, in this Embodiment, the raw material is a gas, and therefore the air is supplied directly to the raw material. Reference numeral 27 denotes a water supplying unit supplying to the reformer 21 water required for the reforming reaction, and is realized as, for example, a plunger pump to supply ion-exchanged water. Reference numeral 28 denotes a controlling unit for feed rate controlling the supply of raw material, air and water supplied to the reformer 21 from the raw material supplying unit 24, the reforming air supplying unit 26 and the water supplying unit 27. This controlling unit for feed rate 28 has a temperature data processing unit (not shown in detail) to observe the condition of temperature measured by the reforming temperature measuring unit 23, and the supply of raw material, air and water is controlled based on this temperature condition. In addition, the controlling unit for feed rate 28 has a capability of storing the temperature condition in a memory unit (not shown in detail) using a semiconductor. Reference numeral 29 denotes a shifter making carbon monoxide in the hydrogen gas and steam after the reformer 21 undergo mainly a shift reaction, which has a transformation catalyst body prepared by having platinum carried on a Ce oxide and making an adjustment thereto to provide a honeycomb substrate in this Embodiment. In addition, a transformation first temperature measuring unit 29b measuring the temperature of a gaseous body is provided in the upstream of the flow of hydrogen gas, and a transformation second temperature measuring unit 29c measuring the temperature of a gaseous body is provided in the downstream of hydrogen gas. Reference numeral 210 is a purification air supplying unit supplying air as an oxidation gas to the hydrogen gas after the shifter 29, which is realized as, for example, an air pump. Reference numeral 211 denotes a purification unit to reduce the content of carbon monoxide in the hydrogen gas after the shifter 29 by mainly oxidizing the carbon monoxide, which has a purification catalyst prepared by having platinum carried on alumina and making an adjustment thereto to provide a honeycomb substrate in this Embodiment. In addition, a purification first temperature measuring unit 211b measuring the temperature of a gaseous body is provided in the upstream of the flow of hydrogen gas, and a purification second temperature measuring unit 211c measuring the temperature of a gaseous body is provided in the downstream of the flow of hydrogen gas. In this Embodiment, the carbon monoxide removing unit is constituted by the shifter 29 and the purification unit 211.

In addition, the values of temperatures measured by the transformation first temperature measuring unit 29b, the transformation second temperature measuring unit 29c, the purification first temperature measuring unit 211b and the purification second temperature measuring unit 211c are captured in a logger 212 for measurement of temperature, and variation in temperature conditions is observed in the temperature data processing unit of the controlling unit for feed rate 28. In addition, gas cooling units as gas cooling means of adjusting the temperature of hydrogen gas (not shown in detail) are provided at the gas inlets of the shifter 29 and the purification unit 211 to adjust the temperatures of the transformation catalyst body and the purification catalyst body. Furthermore, the hydrogen gas after the purification unit 211 is supplied to a power generation system using a fuel cell requiring hydrogen or an ammonium synthesis system and used therein.

Normal apparatus operations in this hydrogen generator will be described below.

First, natural gas as a raw material is supplied from the raw material supplying unit 24 to the reformer 21. The odorant component in natural gas is removed by the desulfurization unit 25 in advance because it acts as a poisoning component for there forming catalyst. In this Embodiment, the zeolite absorbent is used, and therefore the molecules of the sulfur component (hereinafter referred to also as sulfur containing component) contained in the raw material are reduced to one hundred-millionth (10 ppb) of the total mole number of molecules of the raw material. Air as an oxidant is added to the raw material after the desulfurization unit 25 from the reforming air supplying unit 26, and thereafter the raw material is supplied to the reformer 21. At the same time, water required for the reforming reaction is supplied to the reformer 21 from the water supplying unit 26. The amount of water supplied is approximately three times as large as the number of carbon atoms in natural gas. The raw material, air and water supplied to the reformer 21 are heated in the preheating unit 21a, and are thereafter fed to the reforming catalyst unit 21b. In the reforming catalyst unit 21b, the reforming reaction is made to proceed on the reforming catalyst 21c having a temperature of about 700° C. At this time, a part of natural gas is burned in the heating unit 22 to supply a required amount of heat for the reforming reaction.

In addition, the temperatures of the reforming catalyst 21c in the reforming catalyst unit 21b and the reacted gas are measured by the reforming temperature measuring unit 23, and the conditions of measured temperatures are measured by the temperature data processing unit of the controlling unit for feed rate 28. The raw material supplying unit 24, the reforming air supplying unit 26 and the water supplying unit 27 are controlled, respectively, so that the raw material, air and water are supplied in predetermined amounts based on the measured temperature conditions.

About 10% of carbon monoxide and carbon dioxide (dry gas base) is contained in the hydrogen gas after the reformer 21. Then, this hydrogen gas is supplied to the reformer 29.

In the shifter 29, the shift reaction between carbon monoxide and water is made to proceed with the reforming catalyst being kept at a temperature of about 250° C. As a result, about 0.5% of carbon monoxide and about 19.5% of carbon dioxide (dry gas base) are contained in the hydrogen gas after the shifter 29.

Then, air as an oxidation gas is supplied to the hydrogen gas from the purification air supplying unit 210. In the purification unit 211, carbon monoxide in the hydrogen gas is made to react with oxygen by the purification catalyst to reduce the content of carbon monoxide. For effectively reducing the content of carbon monoxide, operations are carried out so that the temperature of the purification catalyst body is in the range of from 120 to 160° C. Furthermore, the temperatures of the transformation catalyst body and the purification catalyst body are adjusted by a gas air-cooling unit based on the temperatures of the transformation catalyst body and the purification catalyst body measured by the transformation first temperature measuring unit 29b, the transformation second temperature measuring unit 29c, the purification first temperature measuring unit 211b and the purification second temperature measuring unit 211c.

According to the present invention, the content of carbon monoxide is effectively reduced, and the hydrogen gas is efficiently supplied by the above operations. However, the sulfur containing component such as an odorant component of urban gas, for example, or the sulfur component existing originally in crude oil or the like is contained in the raw material such as a hydrocarbon component such as natural gas and LPG, an alcohol such as methanol or a naphtha component. The sulfur component is generally a poisoning component causing a decrease in catalytic activity for many catalysts. The same goes for the reforming catalyst for use in steam reforming. In particular, in the steam reforming method, a reaction proceeds essentially under reduced conditions, and therefore the sulfur component is easily accumulated on the catalyst. As a result, the catalyst is poisoned, thus making it impossible to supply the hydrogen gas with stability. Thus, the sulfur component in the raw material is removed in advance, and then the raw material is subjected to the reforming reaction to cope with the problem, but the sulfur component cannot be fully removed. For example, the zeolite absorbent used in this embodiment is capable of reducing the content of sulfur containing component in the raw material to at most one hundred-millionth (10 ppb) or smaller of the total mole number of molecules of the raw material. Therefore, a ruthenium based catalyst or a nickel based catalyst that is generally used in a reforming reaction finally suffers a decrease in catalytic activity due to the accumulation on the catalyst of the sulfur component not removed by the zeolite absorbent.

Thus, in this embodiment, air as an oxidant is added to a raw material gas, and thereafter the reforming reaction with water is made to proceed to enhance the sulfur resistance of the reforming catalyst. In addition, a carrier made of platinum or metal oxide is used as the reforming catalyst.

The platinum catalyst has relatively high resistance to sulfur. However, it has a disadvantage that carbon is easily precipitated compared to other catalysts. This tendency is significant particularly in the steam reforming reaction carried out under a reduced condition. Thus, in the present invention, a metal oxide is used as a catalyst carrier to provide a capability of supplying oxygen from the carrier to the catalyst, whereby precipitation of carbon is prevented. At the same time, a capability of preventing the accumulation of the sulfur component on the catalyst is provided to prevent a decrease in catalytic activity.

Next, from a viewpoint of enhancing the sulfur resistance of the reforming catalyst and preventing precipitation of carbon, air as an oxidant is added in advance to the raw material gas to provide the following effects. The oxygen in the raw material oxidizes the sulfur component with the catalyst to form a sulfur oxide, thereby minimizing the amount of sulfur component accumulated on the catalyst. In addition, carbon precipitated on the catalyst is oxidized by carbon monoxide and carbon dioxide, thus making it possible to effectively prevent a decrease in catalytic activity associated with the precipitation of carbon.

When oxygen is actively supplied to the raw material, the concentration of raw material for use in steam reforming is reduced. In addition, when air is used as an oxidant, nitrogen remains in the hydrogen gas. Finally, there arises a problem such that the concentration of hydrogen gas after the hydrogen generator is reduced as in the case of the disadvantage of the autothermal method that has been traditionally used.

On the other hand, the present invention is also characterized in that in the steam reforming reaction capable of increasing the concentration of hydrogen, enhancement of sulfur resistance of the reforming catalyst is given a high priority, and the amount of oxygen gas to be supplied is defined based on the content of sulfur containing component in the raw material. The content of sulfur component in the raw material varies depending on the type of raw material. For example, the natural gas supplied as urban gas contains about 10 ppm of sulfur component as an odorant component. In addition, the kerosene that is generally sold contains about 100 ppm of sulfur component.

The sulfur component in the raw material is removed with the desulfurization unit 25 in advance, but in case where the desulfurizing agent is broken, the sulfur component in the raw material is directly supplied to the reforming catalyst 21c. It is necessary to define the amount of oxidation gas to be supplied according to the type of raw material used, and by supplying an amount of oxidant at least capable of fully oxidizing the sulfur component, the catalyst activity can be retained.

Since the content of sulfur component in the raw material can be known by carrying out analysis in advance, the amount of air to be supplied may be defined according to the type of raw material and the content of sulfur component. In addition, prevention of carbon precipitation can be achieved by supplying an amount of air required for making carbon atoms in the raw material react with carbon monoxide. The amount of required air varies depending on the amount of water supplied for making the steam reforming reaction proceed, but the amount of air may be defined as the maximum amount so that the maximum amount of carbon component in the raw material gas is oxidized into carbon monoxide.

Furthermore, this Embodiment may have a configuration in which a sulfur concentration detecting unit is provided for directly measuring the amount of sulfur component in the raw material. In this case, the sulfur concentration detecting unit has a burning unit to burn a part of raw material in a hydrogen flame, and the atomic adsorption of the burned raw material may be used to measure the concentration of sulfur contained in the fuel, or the atomic adsorption may be measured directly from the raw material to determine the concentration in the case of the concentration of raw material in a liquid state. Furthermore, the sulfur concentration detecting unit may be provided at any location in the line from the raw material supplying unit 24 to the reformer 21 through which the raw material is transported.

In this Embodiment, one Example of studying the above effects will be described below. Natural gas (main component: methane) was used as a raw material, and water was supplied to the reformer 21 so that the amount of water was three times as large as the number of carbon atoms in the raw material. Hydrogen sulfide was added as a sulfur component in the raw material so that the concentration of sulfur was 1000 ppm with respect to the raw material. As the reforming catalyst 21c, a catalyst with a ruthenium based catalyst carried on an alumina carrier and a catalyst with platinum based catalyst carried on a ceria and zirconia oxide carrier were used. In each of the catalysts, the methane reactivity of the hydrogen gas after the reformer 21 was compared for the following four conditions: (A) the raw material gas is supplied directly to the reformer 21 without using the desulfurization unit 25; (B) the raw material gas is supplied to the reformer 21 without using the desulfurization unit 25 after air required for converting hydrogen sulfide into sulfur dioxide is added to the raw material; (C) the raw material gas is supplied to the reformer 21 using the desulfurization unit 25; and (D) the raw material gas is supplied to the reformer 21 using the desulfurization unit 25 and after air required for converting hydrogen sulfide into sulfur dioxide is added.

First, in the case of the catalyst with a ruthenium based catalyst carried on an alumina carrier, the methane reactivity was significantly decreased immediately after the supply of the raw material gas was started for (A) For (B), the methane reactivity was also significantly decreased immediately after the supply was started. For (C), methane reactivity was retained immediately after the supply was started, but the reactivity was increased as supply time elapsed. For (D), the tendency of decreasing the reactivity was not decreased as the reactivity when only the desulfurizing agent was used, but the reactivity was finally decreased as supply time elapsed.

In the case of the catalyst with a platinum based catalyst carried on a ceria and zirconia oxide carrier, the reactivity was slightly decreased immediately after the supply of the raw material gas was started compared with the activity during reforming of natural gas containing no sulfur, but the decrement of the reactivity was not decreased as the catalyst with a ruthenium based catalyst carried on an alumina carrier for (A). For (B) the reactivity was slightly decreased immediately after the supply of the raw material gas was started, compared with the activity during reforming of natural gas containing no sulfur, but thereafter the activity was less significantly decreased. For (C), the reactivity was almost the same as the reactivity during reforming of natural gas containing no sulfur, and there was almost no decrease in activity with supply time. For (D), the reactivity was almost the same as the reactivity during reforming of natural gas containing no sulfur, and there was almost no decrease in reactivity with supply time.

In the above Example, it was shown that by making a reforming reaction with water progress after adding air as an oxidant to a raw material gas, and using as a reforming catalyst a carrier constituted by platinum and a metal oxide, sulfur resistance of the reforming catalyst can be enhanced. In addition, it was shown that in case where the desulfurizing agent is broken, the catalyst activity can be retained by supplying an amount of oxidant at least capable of fully oxidizing the sulfur component.

Furthermore, in this Embodiment, a zeolite absorbent is used as the desulfurization unit 25. For retaining a catalyst activity, it is effective to remove the sulfur component in the raw material in advance, and it is desirable that for the content of sulfur component after being reduced by the zeolite absorbent, the number of molecules of the sulfur component in the raw material is one hundred-millionth (10 ppb) or smaller of the total mole number of molecules of the raw material. In addition, since the sulfur component remaining in the raw material affects the catalyst after the reformer, it is desirable that the catalyst of the carbon monoxide removing unit consisting of the shifter 29 and the purification unit 211 is also constituted by a platinum catalyst having excellent resistance to sulfur as in this Embodiment if considering the sulfur resistance of the catalyst.

(Embodiment 6)

Embodiment 6 of the present invention will now be described. The apparatus used in Embodiment 6 has a configuration almost identical to that of the apparatus shown in Embodiment 5, and therefore detailed descriptions thereof are not presented here.

Apparatus operations are also similar to those of Embodiment 5, and therefore detailed descriptions thereof are not presented here, and only a different point is described. The different point is that a reference value is set for the detected temperature in the reforming temperature measuring unit 23 measuring the temperature in the reforming catalyst 1c, and if the detected temperature exceeds this reference value when the raw material, water and an oxidation gas are supplied in predetermined reference amounts, it is determined that the content of sulfur containing component after the desulfurization unit 25 is increased, and that if the detected temperature exceeds the reference value, the controlling unit for feed rate 28 is controlled so that the oxidation gas is supplied in an amount larger than the reference amount.

The steam reforming reaction is an endothermic reaction, thus the heat required for the reaction is essentially supplied from the heating unit 22. In addition, in this Embodiment, air is supplied as an oxidant in accordance with the raw material, and thus the heat generated during oxidation of the raw material is used in this reaction. When the fixed amounts of raw material, water and air are supplied, provided that the catalytic activity is not decreased, the transfer of the heat of reaction proceeds almost stably. In other words, when fixed amounts of raw material, water and air are supplied, the reaction proceeds from the upstream of the flow of the above raw material, etc. in the reforming catalyst 12c loaded in the reformer 21, and a reaction to proceed is determined by the position of the catalyst, and therefore the catalyst temperature is constant at any catalyst position. However, if the catalytic activity is decreased, the portion in which the reforming reaction proceeds is shifted from the upstream to the downstream of the flow, and therefore the temperature condition of the catalyst is changed. In particular, a significant decrease in reactivity of the catalyst is often caused by the sulfur component contained in the raw material. For example, if the desulfurizing agent is broken to increase the content of sulfur component in the raw material, the reactivity of the reforming catalyst is decreased from the upstream. Since steam reforming that is a endothermic reaction becomes difficult to proceed as a result of decreased reactivity, the catalyst temperature in that portion rises. According to the present invention, the phenomenon is used to detect a decrease in catalytic activity and detect an increase in the content of sulfur component after the desulfurizing agent.

In addition, in order to observe the situation effectively, a change in temperature in the portion in which the steam reforming reaction between the raw material and water proceeds should be measured. In the present invention to supply the raw material, water and air, the oxidation reaction of the raw material proceeds in the upstream of the catalyst, and the reforming reaction proceeds in the catalyst in the mid and downstream, and it is therefore desirable that the temperature of the portion extending through the midstream to the downstream.

The reference value defined in advance for determining a decrease in catalytic activity varies depending on the type of raw material, and should thus be defined according to conditions of use. In this Embodiment, the reforming reaction is made to proceed at a temperature in the range of from 500 to 800° C. in consideration of the lifetime and reactivity of the reforming catalyst. Thus, when the reference value of detected temperature is defined in the above described temperature range, the rise of catalyst temperature associated with a decrease in catalyst reactivity is increased, thus making it possible to improve accuracy of detection. That is, the above reference value is defined in the temperature range, and when it is detected that the detected temperature rises from the reference value by a predetermined temperature, it is determined that the catalytic activity decreases.

Furthermore, comparison means 28a provided in the controlling unit for feed rate 28a is used for comparing the reference value with the detected temperature. However, the comparison means 28a may be provided in other place.

Also, the exchange of the desulfurizing agent in the desulfurization unit 25 can be promoted by electrically displaying the fact that an increase in the content of sulfur component in the raw material after the desulfurization unit has been detected, for example by providing visual display by installing a desulfurization unit break detecting lamp to detect the break of the desulfurizing agent in the desulfurization unit 25 and allowing the lamp to be lit, and so on.

The catalyst reactivity decreased due to an increase in the content of sulfur component contained in the raw material after the above desulfurization unit 25 can be recovered by increasing the amount of air added to the raw material. The catalyst reactivity is decreased when the sulfur component is deposited on the reforming catalyst 21c, and the area of the catalyst active site is thereby reduced. However, the deposited sulfur component can be removed by increasing the content of air in the raw material to make the sulfur component react and form sulfur oxide. Therefore, this Embodiment is also characterized in that if the detected temperature exceeds the reference temperature, the controlling unit for feed rate 28 is operated so that the oxidation gas is supplied in an amount larger than the reference amount, thereby carrying out operations for recovering the catalyst reactivity.

One example of operation in this Embodiment will now be described. A platinum based catalyst carried on a ceria or zirconia oxide carrier was used as a reforming catalyst, and natural gas (main component: methane) as a raw material and water were supplied to the reformer so that the amount of water was three times as large as the number of carbon atoms in the raw material. In addition, air was supplied on the assumption that the concentration of sulfur component would be 1000 ppm with respect to the raw material. First, on the condition that no sulfur component was added, operation conditions were set so that the reference value of detected temperature in the reforming temperature measuring unit 23 was 600° C.

Next, when hydrogen sulfide was added so that the concentration of sulfur component in the raw material after the desulfurization unit 25 was 1000 ppm with respect to the raw material as a condition for forcefully breaking the desulfurizing agent, the detected temperature in the reforming temperature measuring unit 23 was 650° C. This is because the reactivity of the catalyst was decreased due to the sulfur component in the raw material as described above.

Furthermore, since the temperature exceeds the reference value, 600° C., a warning can be given to the outside by employing the above-mentioned desulfurization unit break detecting lamp etc., indicating that an increase in the content of sulfur component has been detected.

Next, the amount of air supplied was doubled in this state. The oxidation level of the raw material was increased, while the catalyst reactivity was recovered due to an increase in supply of the oxidation gas. As a result, the concentration of methane after the reformer 21 was reduced by an amount equal to or larger than the amount equivalent to oxidation caused by the increased amount of air. The increase of the amount of air may be carried out automatically, or maybe carried out manually by a user observing an increase in the content of sulfur component using the desulfurization unit break detecting lamp. The selection as to whether this supply controlling operation is carried out automatically or manually may be applied similarly in the Embodiments described below.

Furthermore, for the reference amounts in supply of the raw material, water and the oxidation gas, appropriate values may be determined in consideration of apparatus operation conditions such as an apparatus configuration and the type of raw material.

(Embodiment 7)

Embodiment 7 in the present invention will now be described. The apparatus used in Embodiment 7 has a configuration almost identical to that of the apparatus shown in Embodiment 5, and therefore detailed descriptions thereof are not presented here.

Apparatus operations are also similar to those of Embodiments 5 and 6, and therefore detailed descriptions thereof are not presented here, and only a different point is described. The different point is that a reference value is set for the detected temperature in the reforming temperature measuring unit 23 measuring the temperature in the reforming catalyst 1*c*, and if the detected temperature exceeds this reference value when the raw material, water and an oxidation gas are supplied in reference amounts, the controlling unit for feed rate 28 is controlled so that the oxidation gas is supplied in an amount larger than the reference amount when the production of hydrogen gas is stopped, and thereafter the supply of the raw material, water and the oxidation gas is stopped, and that a memory unit memorizing the fact that the detected temperature exceeds the reference temperature is provided in the controlling unit for feed rate 28, and if the memory unit remembers that the reference temperature was exceeded at the time of starting the apparatus, the controlling unit for feed rate 28 is controlled so that the oxidation gas is supplied in an amount larger than the reference amount, and thereafter the raw material, water and the oxidation gas are supplied in reference amounts.

According to the above operations, if the content of sulfur component in the raw material after the desulfurization unit 25 is increased to decrease the reactivity of the reforming catalyst 21*c*, the reactivity of the catalyst can be recovered at the time when the hydrogen generator is stopped or started. When the content of sulfur component in the raw material after the desulfurization unit 25 is increased, the sulfur component is deposited on the reforming catalyst 21*c*, and the area of the catalyst active site thereby decreases, thus causing a decrease in catalyst reactivity. However, the deposited sulfur component can be made to react with the oxidation gas and removed as sulfur oxide by increasing the content of air in the raw material. Therefore, in this Embodiment, if it is detected that the detected temperature exceeds the reference temperature, the controlling unit for feed rate 28 is operated to increase the supply of the oxidation gas so as to supply an amount of oxidation gas larger than the reference amount, thereby carrying out the operation for recovering the catalyst reactivity. In addition, if the controlling unit for feed rate remembers that the detected temperature exceeded the reference temperature, the supply of the oxidation gas is increased so as to supply an amount of oxidation gas larger than the reference amount, at the time of starting the apparatus, and thereafter the raw material, water and the oxidation gas are supplied in reference amounts, whereby the operation for recovering the catalyst reactivity can be carried out.

Furthermore, if it is detected that the detected temperature exceeds the reference temperature, it is desirable that the desulfurizing agent of the desulfurization unit 25 is exchanged before the apparatus is started to create a situation in which the content of sulfur component in the raw material after the desulfurization unit 25 can be reduced.

(Embodiment 8)

Embodiment 8 in the present invention will now be described. The apparatus used in Embodiment 8 has a configuration almost identical to that of the apparatus shown in Embodiment 5, and therefore detailed descriptions thereof are not presented here. The apparatus of this Embodiment differs from that of Embodiment 5 in that a catalyst prepared by having platinum and ruthenium carried on alumina and making an adjustment thereto to provide a honeycomb substrate is used as a purification catalyst (not shown) in the purification unit 211.

Apparatus operations are also similar to those of Embodiment 1, and therefore detailed descriptions thereof are not presented here, and only a different point is described. The different point is that a reference value is defined for the gas temperature detected in the purification second temperature measuring unit 211*c* provided in the downstream of the flow of hydrogen gas, and if the detected temperature falls short of the reference temperature, an increase in the content of sulfur component in the hydrogen gas is detected.

In the purification unit 211, an amount of air larger than the amount required for oxidizing carbon monoxide as an oxidant is supplied from the purification air supplying unit 210 so that a reaction for oxidizing carbon monoxide to reduce the content thereof is made to proceed effectively. The oxidation reaction of oxygen monoxide and hydrogen increases the temperature of the downstream of the purification catalyst. If the content of sulfur component in the raw material after desulfurization unit 25 increases, the sulfur component reaches the purification unit 211 serving as a carbon monoxide removing unit. The catalyst in the purification unit 211 also suffers a decrease in catalyst reactivity due to the sulfur component, and thus the amount of generated heat is reduced. Therefore, the concentration of sulfur component in the hydrogen gas is increased, whereby the temperature condition in the purification catalyst body is changed, and the temperature of the downstream of the purification catalyst decreases. Thus, the decrease in temperature is detected to detect an increase in the content of sulfur containing component in the hydrogen gas in this Embodiment. In this Embodiment, a catalyst prepared by having platinum and ruthenium carried on alumina and making an adjustment thereto to provide a honeycomb substrate is used as a purification catalyst. This is because ruthenium is inferior to platinum in resistance to sulfur (hereinafter referred to as sulfur resistance), and suffers a significant decrease in temperature. This is because ruthenium is inferior to platinum in resistance to sulfur (hereinafter referred to as sulfur resistance), and suffers a significant decrease in temperature.

(Embodiment 9)

Figure 9:
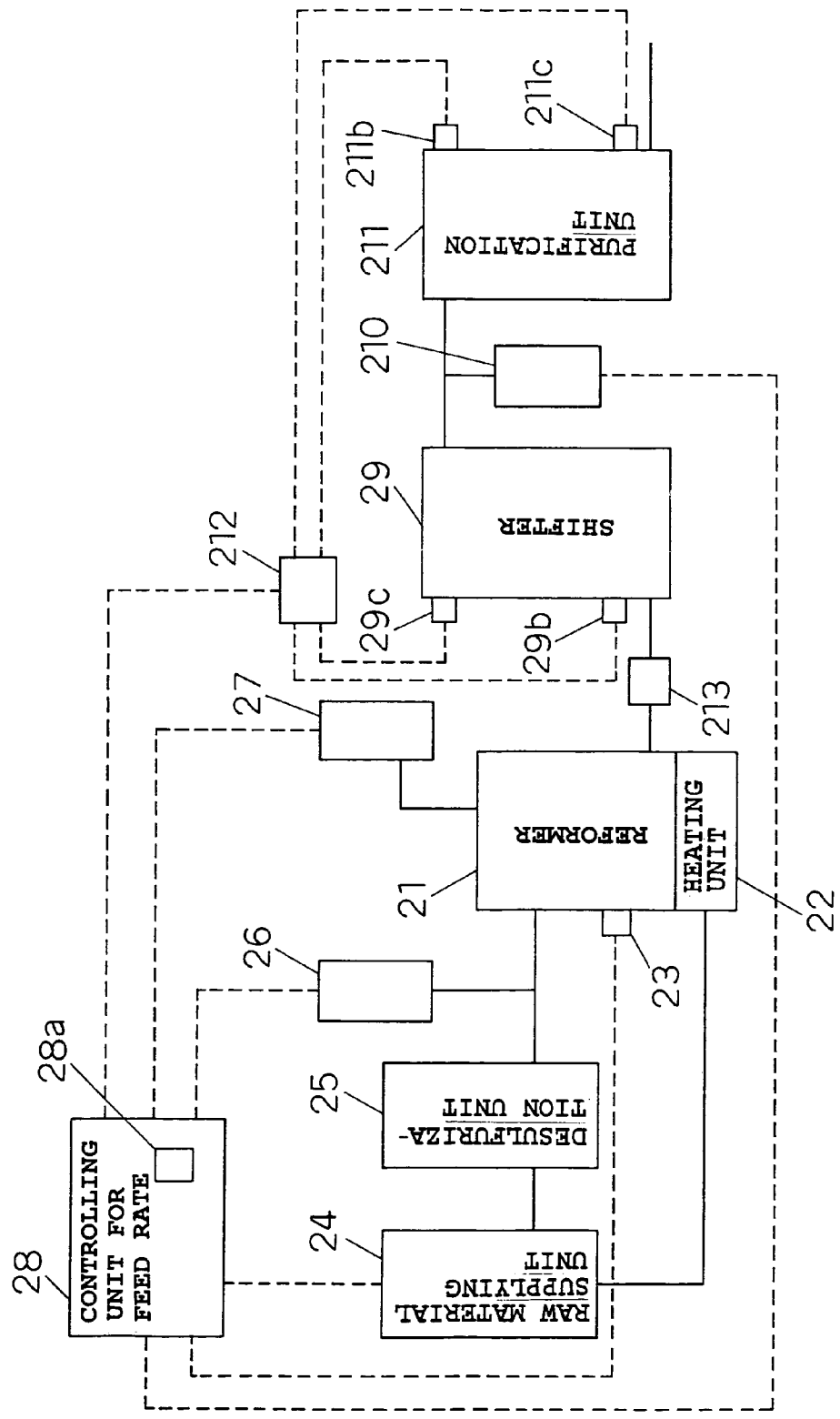
FIG. 9 is a block diagram of the hydrogen generator in Embodiment 9 of the present invention.

Embodiment 9 in the present invention will now be described. FIG. 9 is a block diagram of the hydrogen generator in Embodiment 7 of the present invention. The apparatus used in Embodiment 9 has a configuration almost identical to that of the apparatus shown in Embodiment 5, and therefore detailed descriptions thereof are not presented here. The apparatus of this Embodiment differs from that of Embodiment 5 in that a post-reforming desulfurization unit 213 is provided for removing a residual sulfur component in the hydrogen gas after reformer 21. Furthermore, zinc oxide is used as a main desulfurizing agent in the post-reforming desulfurization unit 213 of this Embodiment.

Apparatus operations are also similar to those of Embodiment 5, and therefore detailed descriptions thereof are not presented here, and only a different point is described. The different point is that the post-reforming desulfurization unit 213 is provided to remove the sulfur component in the hydrogen gas after the reformer 2.

When the hydrogen gas is produced by the reforming reaction, the sulfur component in the raw material is also hydrogenated to form hydrogen sulfide. Hydrogen sulfide can be removed easily by making hydrogen sulfide react with a metal oxide to form a sulfide. For example, as in this Embodiment, zinc oxide is made to react with hydrogen sulfide to form zinc sulfide, thereby removing the hydrogen sulfide.

Since a catalyst having high sulfur resistance shown in the present invention can be used for the reforming catalyst, a possible increase in the content of sulfur component in the raw material can be coped with without causing any problems. However, the catalyst in the carbon monoxide removing unit or an apparatus to which the hydrogen gas is supplied is not necessarily made of the same material as the reforming catalyst, and therefore may be poisoned by the sulfur component. Thus, as shown in this Embodiment, the post-reforming desulfurization unit 213 is provided to remove the sulfur component, thereby making it possible to alleviate an impact on other catalysts. In addition, even if the desulfurizing agent of the desulfurization unit 25 after the raw material supplying unit 24 is broken to rapidly increase the content of sulfur component in the raw material, an impact on other catalysts can be alleviated by providing the post-reforming desulfurization unit 213.

Furthermore, the post-reforming desulfurization unit 213 is provided in this Embodiment, but the sulfur component in the post-reforming gas can further be removed by using a copper-zinc based catalyst as a transformation catalyst of the shifter 29 serving as a carbon monoxide removing unit. This is because the copper atom is easily coordinate-bonded directly with the sulfur atom of the sulfur component, and thus the copper component of the copper-zinc based catalyst functions as a desulfurizing agent.

Furthermore, in the descriptions of the above Embodiments 4 to 9, the reforming catalyst 21c is composed of platinum and a metal compound, but the removal of the sulfur component by the supply of an oxidation gas according to the present invention is carried out in such a manner that the sulfur component on the catalyst is removed by giving the oxidation gas to the catalyst. Therefore, the catalyst of the present invention may be composed of platinum alone. In addition, a metal other than platinum may be used as the catalyst of the present invention as long as it neither suffers degradation of catalytic performance by the oxidation gas nor undergoes poisoning. For enhancing the effect of removing the sulfur component, however, it is desirable that the configurations of the above described Embodiments are adopted.

(Embodiment 10)

Figure 10:
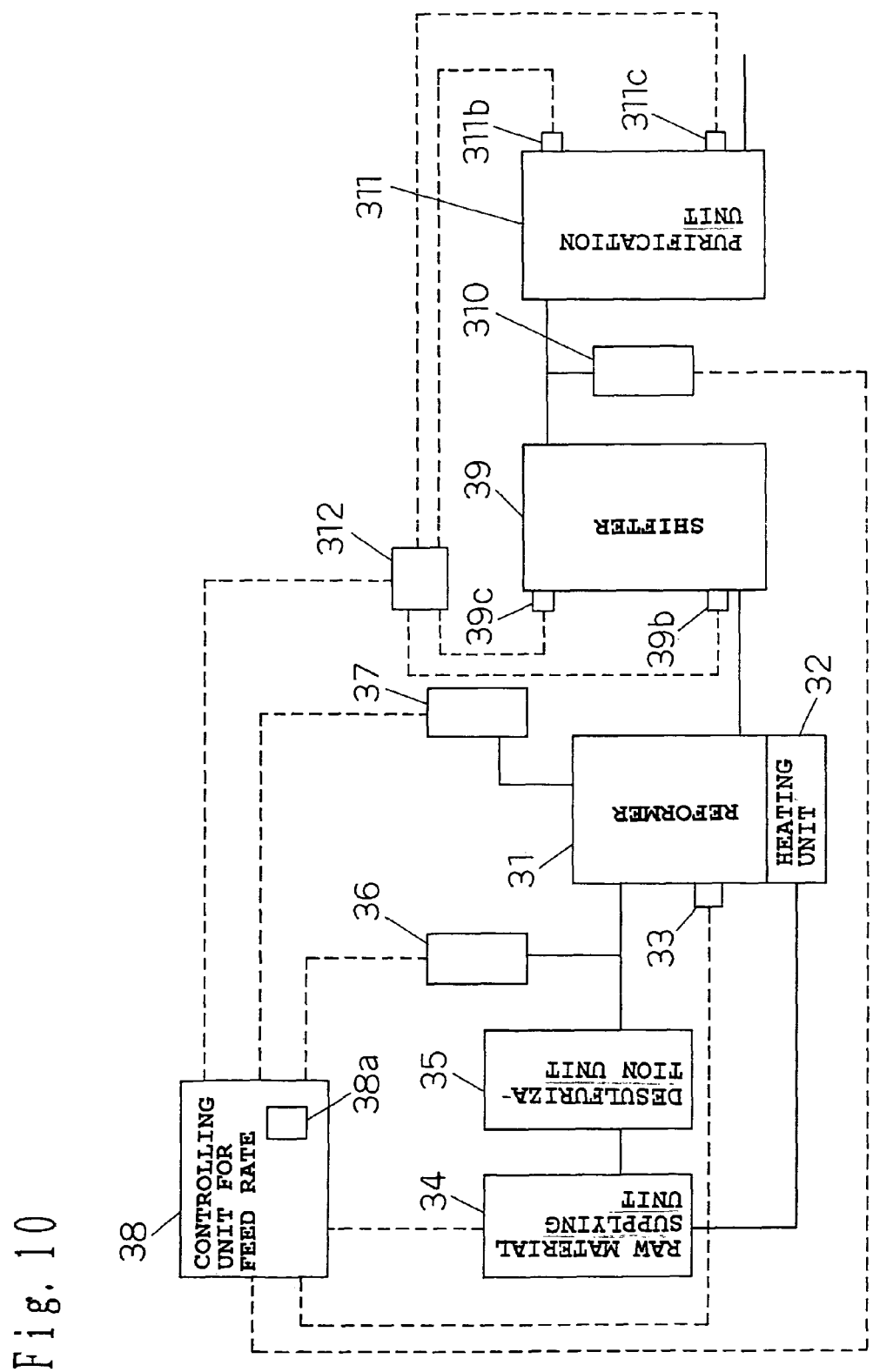
FIG. 10 is a block diagram of the hydrogen generator in Embodiment 10 of the present invention.

FIG. 10 is a block diagram of the hydrogen generator in Embodiment 10 of the present invention. In FIG. 10, reference numeral 31 denotes means equivalent to the reformer of the present invention, which makes mainly a reforming reaction between a raw material such as a hydrocarbon component such as natural gas and LPG, an alcohol such as methanol or a naphtha component and steam progress.

Figure 11:
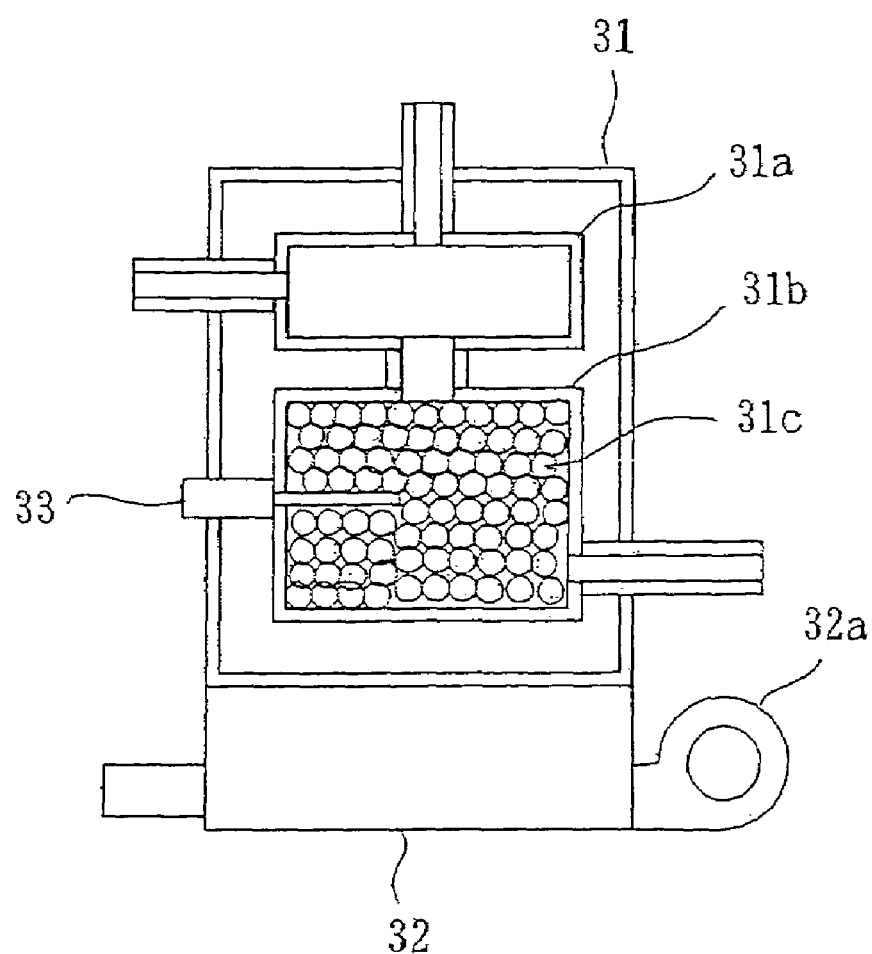
FIG. 11 is a detailed block diagram of the reformer.

In addition, the details of the reformer 31 are shown in FIG. 11. In FIG. 11, a preheating unit 31a is means of preheating the raw material, water and air, a reforming catalyst unit 31b is means storing a reforming catalyst 31c, and a platinum catalyst carried on a Zr oxide carrier is used for the reforming catalyst 31c as a catalyst prepared by having platinum carried on a metal oxide and making an adjustment thereto.

In addition, a heating unit 32 is means of supplying heat required for the reforming reaction to the reformer 31. The heating unit 32 is a flame burner to burn a part of raw material or burn a gas returned from an object to which the hydrogen gas is supplied, and comprises a sirocco fan 3a for supplying combustion air (not shown in detail). A reforming temperature measuring unit 33 is means of measuring the temperature in the reforming catalyst 1c. A raw material supplying unit 34 is means of supplying a hydrocarbon component such as natural gas and LPG, an alcohol such as methanol, or a naphtha component to the reformer 31 as a raw material. In this Embodiment, the raw material supplying unit 34 has a configuration such that natural gas supplied as a fuel infrastructure is used, and a booster which increases the supply pressure of natural gas is provided.

A desulfurization unit 35 is means of reducing the content of sulfur component in the raw material, for which a zeolite absorbent to remove an odorant component in natural gas is used in this Embodiment. A reforming air supplying unit 36 is means constituted by an air pump supplying air as an oxidation gas to the raw material, which is so constituted as to supply air directly to the raw material because the raw material is a gas in this embodiment. A water supplying unit 37 is means of supplying water required for the reforming reaction to the reformer 31, which is realized as, for example, a plunger pump, and supplies ion-exchanged water. A controlling unit for feed rate 38 is means of controlling the supply of the raw material, air and water supplied to the reformer 31 from the raw material supplying unit 34, the reforming air supplying unit 36 and the water supplying unit 37 respectively. This controlling unit for feed rate 38 has a temperature data processing unit (not shown in detail) to observe the condition of temperature measured by the reforming temperature controlling unit 33, and the supply of raw material, air and water is controlled based on this temperature condition. In addition, the controlling unit for feed rate 38 has a capability of storing the temperature condition in a memory unit (not shown in detail) using a semiconductor.

A shifter 39 is means of mainly carrying out a shift reaction between carbon monoxide in the hydrogen gas after the reformer 31 and steam, which has a transformation catalyst body prepared by having platinum carried on a Ce oxide and making an adjustment thereto to provide a honeycomb substrate in this Embodiment. In addition, a transformation first temperature measuring unit 39b measuring the temperature of a gaseous body is provided in the upstream of the flow of hydrogen gas, and a transformation second temperature measuring unit 39c measuring the temperature of a gaseous body is provided in the downstream of hydrogen gas. A purification air supplying unit 310 is means constituted by an air pump supplying air as an oxidation gas to the hydrogen gas after the shifter 39. A purification unit 311 is means of mainly oxidizing carbon monoxide in the hydrogen gas after the shifter 39 and thereby reducing the content of the carbon monoxide, which has a purification catalyst body prepared by having platinum carried on alumina and making an adjustment thereto to provide a honeycomb substrate in this Embodiment. In addition, a purification first temperature measuring unit 311b measuring the temperature of a gaseous body is provided in the upstream of the flow of hydrogen gas, and a purification second temperature measuring unit 311c measuring the temperature of a gaseous body is provided in the downstream of the flow of hydrogen gas. In this Embodiment, the carbon monoxide removing unit of the present invention is constituted by the shifter 39 and the purification unit 311.

In addition, the values of temperatures measured by the transformation first temperature measuring unit 39b, the transformation second temperature measuring unit 39c, the purification first temperature measuring unit 311b and the purification second temperature measuring unit 311c are captured in a logger 12 for measurement of temperature, and variation in temperature conditions is observed in the temperature data processing unit of the controlling unit for feed rate 38. In addition, gas cooling units as gas cooling means of adjusting the temperature of hydrogen gas (not shown in detail) are provided at the gas inlets of the shifter 39 and the purification unit 311 to adjust the temperatures of the transformation catalyst body and the purification catalyst body. Furthermore, the hydrogen gas after the purification unit 311 is supplied to a power generation system using a fuel cell requiring hydrogen or an ammonium synthesis system and used therein.

For the hydrogen generator of this Embodiment having the configuration described above, normal operations will be briefly described first.

First, natural gas as a raw material is supplied from the raw material supplying unit 34 to the reformer 31. The odorant component in natural gas is a poisoning component for the catalyst of an object to which the hydrogen gas is supplied, or the catalyst of each reaction unit, and is therefore removed by forcing them to pass through the desulfurization unit 35. In this Embodiment, since a zeolite absorbent is used as a desulfurizing agent, the number of molecules of the sulfur containing component in the raw material is reduced to one hundred-millionth (10 ppb) or smaller of the total mole number of molecules of the raw material.

The raw material after passing through the desulfurization unit 35 and water required for the reforming reaction from the water supplying unit 36 are supplied to the reformer 31. The amount of water supplied is approximately three times as large as the number of carbon atoms in natural gas.

The raw material and water supplied to the reformer 31 are fed to the reforming catalyst body 31b after being heated in the preheating unit 31a. In the reforming catalyst unit 1b, the reforming reaction is made to proceed on the reforming catalyst 31c having a temperature of about 700° C. At this time, a part of natural gas is burned in the heating unit 32 to supply a required amount of heat for the reforming reaction. In addition, the temperatures of the reforming catalyst 31c in the reforming catalyst unit 31b and the reacted gas are measured by the reforming temperature measuring unit 33, and the conditions of measured temperatures are measured by the temperature data processing unit of the controlling unit for feed rate 38. The raw material supplying unit 34 and the water supplying unit 37 are controlled, respectively, so that the raw material and water are supplied just in preset amounts based on the measured temperature conditions.

About 10% of carbon monoxide and carbon dioxide (dry gas base) is contained in the hydrogen gas after the reformer 31. Then, this hydrogen gas is supplied to the shifter 39. In the shifter 39, the shift reaction between carbon monoxide and water is made to proceed with the transformation catalyst being kept at a temperature of about 250° C. As a result, about 0.5% of carbon monoxide and about 19.5% of carbon dioxide (dry gas base) are contained in the hydrogen gas after the shifter 39.

Then, air as an oxidation gas is supplied to the hydrogen gas from the purification air supplying unit 310. In the purification unit 311, carbon monoxide in the hydrogen gas is made to react with oxygen by the purification catalyst to reduce the content of carbon monoxide. For effectively reducing the content of carbon monoxide, operations are carried out so that the temperature of the purification catalyst body is in the range of 120 to 160° C. Furthermore, the temperatures of the transformation catalyst body and the purification catalyst body are adjusted by a gas air-cooling unit based on the temperatures of the transformation catalyst body and the purification catalyst body measured by the transformation first temperature measuring unit 39b, the transformation second temperature measuring unit 39c, the purification first temperature measuring unit 311b and the purification second temperature measuring unit 311c.

The hydrogen supplying apparatus of this Embodiment effectively reduces the content of carbon monoxide and efficiently supplies the hydrogen gas essentially in accordance with the above operations.

Explanation will now be described more in detail focusing on the operations of the present invention.

It is undesirable that a combustible gas such as hydrogen gas is entrained in the hydrogen supplying apparatus, and remains as a residual gas at the time of stopping the apparatus, from a viewpoint of apparatus safety. It is desirable that the residual gas is removed from the apparatus safely and reliably.

Gas in the apparatus is generally replaced with an inert gas such as nitrogen gas in the conventional hydrogen supplying apparatus. In this Embodiment, the reforming air supplying unit 36 as an oxidation gas supplying unit is operated to start the supply of air at the time of stopping the apparatus, and the supply of the raw material and water is stopped after predetermined time elapses after the supply of air is started, whereby gas in the apparatus is replaced. The above predetermined time is determined by previously measuring time required for fully replacing the residual gas in the apparatus in consideration of the size of apparatus, the raw material and the amount of water to be supplied, and one example thereof is time required for reducing the concentration of hydrogen in the apparatus to a level low enough to prevent the explosion of hydrogen, or time required for fully replacing the residual gas in the hydrogen generator by the flue gas.

At this time, the reforming catalyst needs to have excellent oxidation resistance, and therefore platinum is used for the reforming catalyst 31c to have this platinum carried on a metal oxide carrier such as a Zr oxide in this Embodiment.

Since the conventional Ni based reforming catalyst can retain a catalytic activity under a reduced condition, gas in the apparatus should be replaced with an inert gas to maintain the reduced condition at the time of starting and stopping the apparatus.

Also, the Ru based reforming catalyst tends to undergo catalyst volatilization under an oxidized condition at a high temperature, and thus suffer a decrease in catalytic activity and therefore an inert gas should be used for replacing gas in the apparatus.

On the other hand, the reforming catalyst with a platinum catalyst carried on a Zr oxide carrier, which is used in this Embodiment, has a capability of somewhat retaining a catalytic activity even when it undergoes repetitive oxidation and reduction, and it is placed under an oxidized condition at a high temperature. As a result, in this Embodiment, an oxidation gas less expensive and easier to get, such as air, can be used to achieve the replacement operation without necessity to use an inert gas.

Now, operations in the reformer 31 of the hydrogen generator of this Embodiment will be described for three separate operations of apparatus stop, apparatus start and normal operation, and one embodiment of a method of controlling the operation will be described.

At the time of stopping the apparatus, air is first supplied from the reforming air supplying unit 36 with the supply of the raw material and water being kept, whereby a part of raw material is oxidized in the upstream of the reforming catalyst 1c. By oxidizing the raw material, a flue gas of low activity having nitrogen, carbon dioxide and steam as main components can be produced. At this time, the raw material can be completely burned by controlling the amount of air supplied and the amount of raw material supplied in the controlling unit for feed rate 38, and thus a flue gas of lower activity can be produced.

A residual gas containing hydrogen gas located in the downstream of the reforming catalyst 1c is discharged to the outside with the flue gas to replace gas in the apparatus safely and reliably.

At the time of stopping the apparatus, the production of hydrogen gas is stopped, and therefore the supply of the raw material and water is stopped in the example of conventional apparatus, but in the case of this Embodiment, the replacement of the raw material with the flue gas cannot be sufficiently performed if the supply of the raw material and water is instantaneously stopped. Thus, in this Embodiment, the amounts of raw material and water to be supplied are first reduced from a viewpoint of securing the flue gas at the time of stop operation. At this time, the amount of air supplied is reduced according to the reduction rate of the supply of the raw material. This is because if the amount of raw material supplied is large, a large amount of air needs to be supplied for producing the flue gas serving as an inert gas, and the heat generation causes the temperature of the reforming catalyst 31c to rise resulting in a decrease in catalytic activity. At this time, the decrease rate of the amount of supplied oxidation gas is such that its concentration is kept at a level low enough to prevent explosion of the hydrogen gas or the raw material gas.

In the apparatus stop operation, air is finally supplied in an amount equal to or larger than theoretical amount of air for completely oxidizing the raw material. In this way, a situation in which an unreacted raw material as a combustible material remains in the apparatus can be prevented. In addition, since the flue gas contains steam, water is condensed in the apparatus after stopping the apparatus, and this condensed water may cause the corrosion of the members constituting the apparatus if the flue gas is allowed to remain in the apparatus. Thus, the supply of air is continued after the supply of the raw material and water is stopped, whereby the flue gas of raw material is discharged from the apparatus, and is replaced with air. By this operation, the situation in which the members constituting the apparatus are corroded can be prevented in advance.

Finally, the supply of the raw material and water is stopped, and after predetermined time elapses, the supply of the oxidation gas is stopped. This time is determined based on time required for achieving a temperature low enough to prevent the explosion of hydrogen contained in the residual gas, or time required for the oxidation gas to fully replace the residual gas in the reformer.

The operation at the time of starting the apparatus will now be described.

As long as the apparatus stop operation described above is carried out, the reformer 31 and hence the hydrogen generator are filled with air as an oxidation gas at the time of starting the apparatus, and thus the hydrogen generator can easily be started if the raw material and water are supplied in this state.

If hydrogen gas remains in the hydrogen producing unit due to maintenance or other factors, the reforming air supplying unit 36 as an oxidation gas supplying unit is operated to replace gas in the apparatus with air.

At this time, if a combustible gas remains in the apparatus, and the catalyst temperatures in the reformer 31 and the carbon monoxide removing unit are high, the residual gas may undergo a reaction depending on the amount of air supplied.

In this case, the temperature of the reforming catalyst 31c is measured by the reforming temperature measuring unit 33, and the controlling unit for feed rate 38 operates the reforming air supplying unit 36 so that air is supplied with the measured temperature being kept at a level equal to or lower than a predetermined temperature. This predetermined temperature is a temperature at which the residual gas does not react with the oxidation gas, and is specifically equal to or lower than 100° C., preferably a room temperature. Furthermore, comparison of the predetermined temperature with the temperature measured by the reforming temperature measuring unit 33 is performed by comparison means 38a provided in the controlling unit for feed rate 38. However, the comparison means 38a may be provided in other places instead of the controlling unit for feed rate 38. In the description below, this comparison means 38a is used for operations based on temperature setting.

In this way, gas in the reformer 31 and hence the hydrogen generator can be replaced with air before the operation for producing hydrogen gas, and an apparatus operation can be started reliably under certain conditions.

After this operation, the heating unit 32, the raw material supplying unit 34 and the water supplying unit 37 are operated to make a reaction proceed for producing hydrogen gas. At this time, the supply of the oxidation gas, namely air is continued. A part of raw material is thereby oxidized by the reforming catalyst 1c. The reforming catalyst 1c is heated by the heat from the heating unit 32, but a part of raw material is oxidized and the heat generated by this oxidation also contributed to the heating of the reforming catalyst 1c, thus making it possible to heat the reforming catalyst 1c to an appropriate reaction temperature more quickly.

In addition, the operations of the raw material supplying unit 34 and the water supplying unit 37 are started after predetermined time elapses after the supply of the oxidation gas is started, and the time is determined based on time required for reducing the concentration of hydrogen contained in the residual gas to a level low enough to prevent the explosion of hydrogen, or time required for fully replacing the residual gas in the reformer by the oxidation gas.

In addition, the raw material can completely be burned by controlling the amount of air supplied and the amount of raw material supplied, and thus a flue gas of low activity having nitrogen, carbon dioxide and steam as main components can be produced. This flue gas can also be used to perform an operation for replacing air in the apparatus. By this replacement operation, a situation in which the raw material is in a combustible state can be prevented even if the rate at which the raw material is supplied is thereafter increased.

Then, an operation for increasing the amount of supplied raw material and water to produce hydrogen gas is made to proceed after gas in the apparatus is replaced with the flue gas of raw material gas. At this time, the amount of supplied air is increased according to the increase rate of the amount of raw material. As the amount of raw material is increased, the amount of reaction with water (steam) in the reforming catalyst increases, and the amount of heat required for the reaction increases, thus making it possible to supply heat generated when the raw material is oxidized as heat of reaction between the raw material and water by increasing the amount of air supplied and increasing the amount of raw material oxidized. At this time, the increase rate of the amount of oxidation gas supplied is such that its concentration is kept at a level low enough to prevent explosion of the hydrogen gas or the raw material gas.

In addition, for timing in which the amount of raw material supplied and the amounts of water and air supplied are increased, the temperature of the reforming catalyst 31c may be measured by the reforming temperature measuring unit 33, and the controlling unit for feed rate 38 may operate the raw material supplying unit 34, the water supplying unit 27 and the reforming air supplying unit 36 based on the measured temperature. In this Embodiment, a first set value is defined for the temperature of the reforming catalyst 31c measured by the reforming temperature measuring unit 33, and air is also supplied if the measured temperature exceeds this first set temperature.

Air is supplied for replacing gas in the apparatus with air immediately after the start of the apparatus. After the gas in the apparatus is replaced with air, the supply of air is stopped, the heating unit 32 is activated, the raw material and water are supplied.

Then, after the temperature of the reforming catalyst 31c exceeds the first set temperature, the supply of air is started to oxidize a part of raw material with the reforming catalyst 31c, and a part of heat required for the reaction is supplied. The oxidation reaction of the raw material with the reforming catalyst 31c proceeds after the reforming catalyst 31c is heated to a certain point. Air may be supplied in a state in which the temperature of the reforming catalyst 31c is low, but by supplying air after the temperature of the reforming catalyst 31c rises to some extent, the reaction can proceed efficiently. Therefore, the first set temperature is a temperature at which the oxidation of the raw material with the reforming catalyst is started, for example 400 to 500° C. for natural gas, and 200 to 300° C. for naphtha, and may be defined according to the type of raw material to be used.

In addition, the supply of air for burning a part of raw material also improves a heating status of the carbon monoxide removing unit located in the downstream. For effectively reducing the content of carbon monoxide in hydrogen gas, the catalyst body of the shifter 39 and the purification unit 311 constituting the carbon monoxide removing unit should be heated to an appropriate operation temperature. When air is supplied to the reformer 31, the partial pressure of nitrogen in hydrogen gas increases, leading to an increase in the amount of heat transferred by hydrogen gas and the improvement of heat exchangeability, and as a result the heating status of the carbon monoxide removing unit can be improved.

Furthermore, the amount of supplied air as an oxidation gas is decreased as a shift is made to a steady operation. If a large amount of air is supplied, a heat loss throughout the hydrogen generator is increased due to the fact that heat is taken out by residual nitrogen. Thus, finally, the supply of air may be stopped based on the temperature condition throughout the hydrogen generator. However, for improving the sulfur resistance of the reforming catalyst 1c, a small amount of air may be supplied from the reforming air supplying unit 36 to the raw material after the desulfurization unit 35 during the steady operation. This is because the sulfur component becomes a sulfur oxide due to the existence of oxygen in the raw material, and thus the amount of sulfur component accumulated on the catalyst can be minimized. In addition, carbon precipitated on the catalyst is oxidized into carbon monoxide or carbon dioxide, and therefore a capability of effectively preventing a decrease in catalytic activity associated with carbon precipitation is also exhibited.

Next, if air as an oxidation gas is supplied along with the raw material and water at the time of starting and stopping the apparatus and during steady operation, the upper limit of the amount of air to be supplied should be defined. This is because the reformer 31 maybe heated extremely due to heat generation associated with the oxidation of the raw material if a large amount of air is supplied.

Thus, with consideration given to the heat resistance of materials constituting the reformer 31, the upper limit of the amount of air to be supplied can be defined based on the heat-resistant temperature of the reformer 31.

In this Embodiment, a second set value is defined in advance for the detected temperature in the reforming temperature measuring unit 33 as a representative temperature of the reformer 31, and the controlling unit for feed rate 38 is controlled to operate reforming air supplying unit 36 so that the detected temperature does not exceed the second set value. Here, the second set value is determined based on the heat-resistant temperature of the reforming catalyst 1c. For example, a reforming catalyst with a platinum catalyst carried on a Zr oxide carrier suffers a sharp decrease in catalytic activity at 950° C., and thus the second set value for the reforming catalyst is 900° C. For the second set value, an optimum value may be defined according to the type of catalysts to be used, and the configuration of apparatus.

In addition, if the amounts of water and oxygen in air supplied become insufficient, carbon may be precipitated on the reforming catalyst 1c having a relatively high temperature due to partial cracking of the raw material or the existence of carbon oxide, thus leading to a decrease in catalytic activity or causing the choking of the gas channel by the precipitated carbon.

In this Embodiment, on the other hand, carbon atoms in the raw material are at least oxidized into carbon dioxide, and thus the controlling unit for feed rate 38 operates the water supplying unit 37 and the reforming air supplying unit 36 so that minimum amounts of water and air are supplied. This makes it possible to perform an operation for preventing precipitation of carbon in advance.

Furthermore, in this Embodiment, the reforming catalyst 1c is constituted by a carrier composed of platinum and a metal oxide, whereby the resistance to the sulfur component in the raw material can be improved. The raw material such as a hydrocarbon component such as natural gas and LPG, an alcohol such as methanol, or a naphtha component contains a sulfur containing component such as an odorant component of urban gas, for example, or a sulfur component existing originally in crude oil or the like. The sulfur component is a poisoning component, which can decrease the catalytic activity for many catalysts. The same goes for the reforming catalyst for use in steam reforming. In particular, for the steam reforming method in which the reaction proceeds under a reduced condition, the sulfur component tends to remain on the catalyst, and the catalyst toxicity is strengthened to decrease the steam reforming reactivity.

The Ru based reforming catalyst has essentially low resistance to sulfur. Therefore, for the desulfurization method using an absorbent which has been traditionally used, or the hydro-desulfurization method, the catalytic activity is decreased due to the existence of the sulfur component that cannot be removed.

On the other hand, the Ni based reforming catalyst has high resistance to sulfur compared with the Ru catalyst. Therefore, the reforming catalyst is capable of fitting in certain level to the desulfurization method using an adsorbent material or the hydrodesulfurization method. However, this Ni based reforming catalyst exhibits its steam reforming feature under a reduced condition. Therefore, the reduced condition must be maintained in the apparatus to prevent a situation in which the catalyst is oxidized to cause a decrease in catalytic activity even at the time of stopping the apparatus.

In this way, the Ni based reforming catalyst and the Ru based reforming catalyst that are generally used are easily poisoned with a slight amount of sulfur component, thus making it impossible to supply hydrogen gas stably.

In the conventional hydrogen generator, the sulfur component in the raw material is removed in advance before the raw material is used in the reforming reaction, thereby dealing with the problem. However, it is impossible to fully remove the sulfur component. For example, the zeolite absorbent is capable of reducing the content of sulfur containing component in the raw material to at most one hundred-millionth (10 ppb) or smaller of the total mole number of molecules of the raw material.

As a result, the Ni based catalyst and the Ru based catalyst that are generally used may finally suffer a decrease in catalytic activity. Thus, the reforming catalyst 1c is constituted by a carrier composed of platinum and a metal oxide. The platinum catalyst has relatively high sulfur resistance. However, it has a disadvantage that carbon is precipitated easily compared to other catalysts. This tendency is significant particularly in the steam reforming reaction proceeding under a reduced condition.

Thus, in this Embodiment, a metal oxide is used as a catalyst carrier to provide a capability of supplying oxygen from the carrier to the catalyst, whereby precipitation of carbon is prevented. Since the capability of supplying oxygen from carrier to the catalyst is helpful to prevent the sulfur component from being accumulated on the catalyst at the same time, the decrease in catalytic activity by the sulfur component in the platinum catalyst is prevented.

Furthermore, a Zr oxide is used as a carrier with which the platinum catalyst is combined in this embodiment, but for the present invention, other oxides, for example oxides of Ce, Al, Mg and Mn, or composite oxides of any of these metals and Zr may be used to obtain a similar effect as long as they have the capability of supplying oxygen from the carrier to the catalyst. In addition, platinum alone may be used as a single metal although it is inferior in capability of preventing carbon precipitation. This is because any catalyst may be used as a catalyst required for the present invention unless it is poisoned with a flue gas as an oxidation gas and the catalytic performance is degraded, as a minimum necessary condition. Therefore, a metal other than platinum may be used as long as there is no possibility that it is poisoned with a flue gas and the catalytic performance is degraded.

One Example of studying the above effects in this embodiment will be described.

Natural gas (main component: methane) was used as a raw material, and water was supplied to the reformer so that the amount of water was three times as large as the number of carbon atoms. For comparison of reforming catalysts, an Ni based catalyst carried on an alumina carrier, an Ru based catalyst carried on an alumina carrier and a platinum catalyst carried on a Zr oxide carrier were used. For examining the influence of a high concentration sulfur component, the variation in catalytic activity where a raw material with hydrogen sulfide added thereto in the concentration of 5 ppm with respect to the raw material as a sulfur component in the raw material was directly supplied to the catalyst was measured. In addition, for examining the influence of a low concentration sulfur component, the variation in catalytic activity where the raw material was passed through a desulfurization unit using zeolite to reduce the content of hydrogen sulfide to $5 \times 10^{-3}$ ppm of the original content was measured.

The influence of the high concentration sulfur component is shown in FIG. 12(A), and one Example of measuring the influence of the low concentration sulfur component is shown in FIG. 12(B). It can be understood from FIG. 12(A), the Ru based and Ni based catalysts show a drop in methane conversion rate indicating catalyst reactivity in steam reforming when they are exposed to a relatively high concentration of sulfur component. On the other hand, it can be understood that for the platinum catalyst according to the present invention, a decrease in catalyst reactivity can be prevented.

Figure 12:
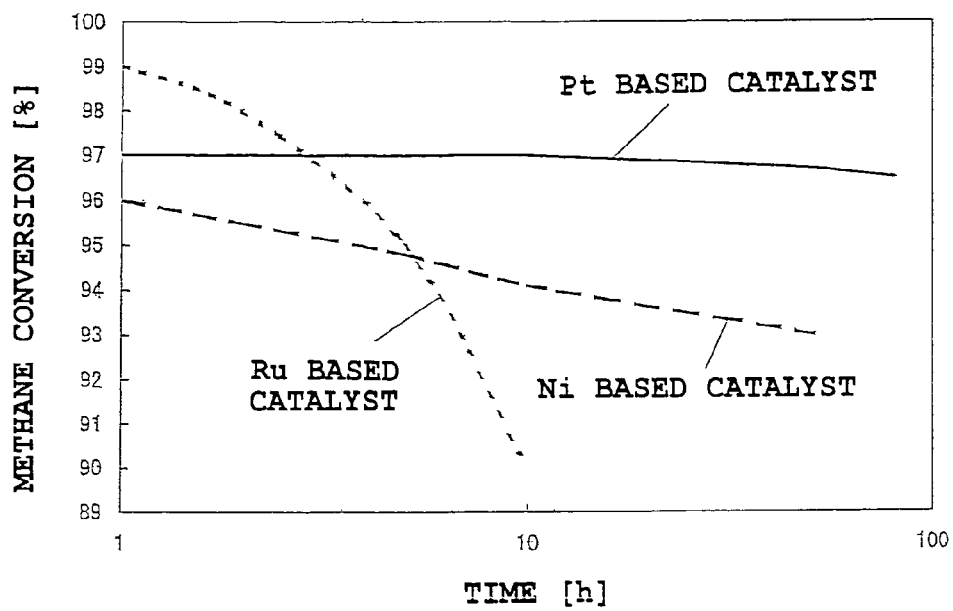
FIG. 12(A) shows a graph of the variation with time of methane conversion rate of the reforming catalyst.
FIG. 12(B) shows a graph of the variation with time of methane conversion rate of the reforming catalyst.
Figure 12:
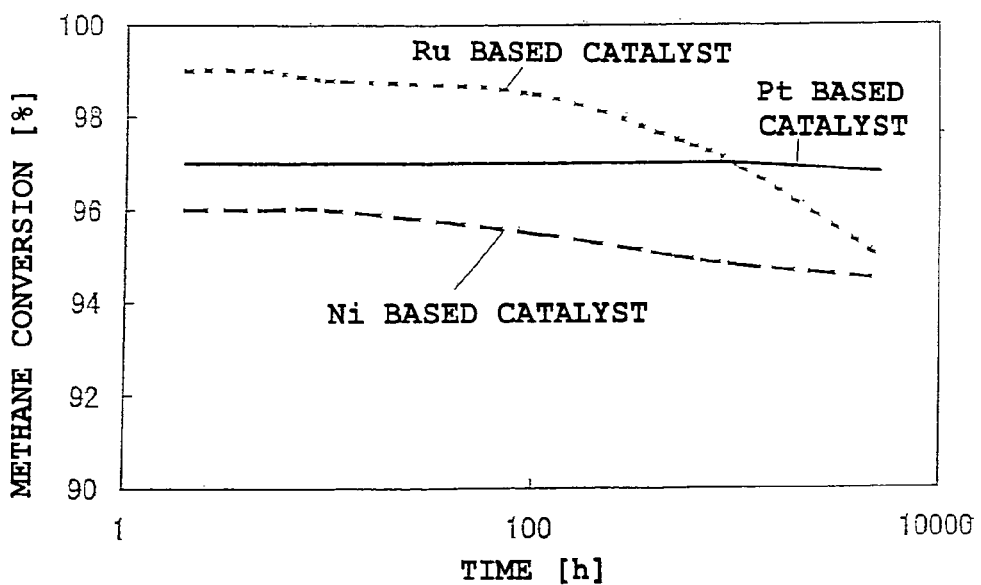

In addition, it can be understood from FIG. 12 (B) that the Ru based catalyst shows a drop in methane conversion rate indicating catalyst reactivity in steam reforming due to the remaining sulfur component when it is used for a long time even in the case where the sulfur component is removed with the desulfurization unit using zeolite, while there is little decrease in catalyst reactivity of the platinum catalyst. The Ni based catalyst shows a level of decrease in reactivity at some midpoint between those of the Ru based catalyst and the platinum based catalyst.

From the above results, it can be understood that the reforming catalyst with a platinum catalyst carried on a Zr oxide carrier has higher resistance to sulfur than the Ru based catalyst that has been traditionally used. In addition, by having platinum carried on the metal oxide, oxygen is supplied from the metal oxide to improve the situation as to carbon precipitation on the catalyst.

A comparison was made between a single platinum catalyst and a platinum catalyst combined with a Zr oxide when natural gas (main component: methane) was used as a raw material, and water was supplied to the reformer so that the amount of water was three times as large as the number of carbon atoms in the raw material. After the catalysts were used for 100 hours, carbon precipitation on the catalyst was observed for the single platinum catalyst while no carbon precipitation was observed for the platinum catalyst combined with the Zr oxide. In addition, the same effects as those described above were obtained for oxides such as oxides of Ce, Al, Mg and Mn or composite oxides of any of these metals and Zr.

Furthermore, the reforming catalyst prepared by having platinum carried on the metal oxide and making an adjustment thereto cannot retain a catalytic activity for a long time in the presence of high concentration of sulfur component. Thus, in this Embodiment, the desulfurization unit 35 is provided for removing the sulfur component in the raw material in advance. In addition, it is desirable that a raw material whose content of sulfur component is small is used as an initial stage. In this case, the influence of sulfur on the reforming catalyst is alleviated, but from a viewpoint of alleviating the influence of catalyst poisoning on an object to which hydrogen gas is supplied, a desulfurization unit using as a desulfurizing agent a metal compound such as zinc oxide and copper zinc may be provided as a hydrogen sulfide removing unit after the reformer 31 to reduce the content of sulfur component after the reformer 1.

Furthermore, in this Embodiment, platinum catalysts is used for the shifter 39 and purification unit 311 both constituting a carbon monoxide removing unit, as well as for the reformer 31. In this way, the hydrogen generator in the present invention has a feature of enhanced oxidation resistance.

For example, the Cu—Zn based catalyst that is generally used as a catalyst of the shifter has poor oxidation resistance. Thus, as shown in this Embodiment, a problem arises such that the catalyst is oxidized to decrease the catalytic activity if gas in the apparatus is replaced with air as an oxidation gas. However, in this Embodiment, all the catalysts are constituted by platinum based catalysts having excellent oxidation resistance, thereby making it possible to easily cope with such a problem. Also, in addition to platinum, precious metals such as Rh, Pd and Ru have excellent oxidation resistance as long as they are used at an appropriate temperature in view of their heat resistance. Therefore, by using a catalyst containing at least one of those precious metals in the carbon monoxide removing unit, gas in the apparatus can be replaced with air without any problems.

(Embodiment 11)

Figure 13:
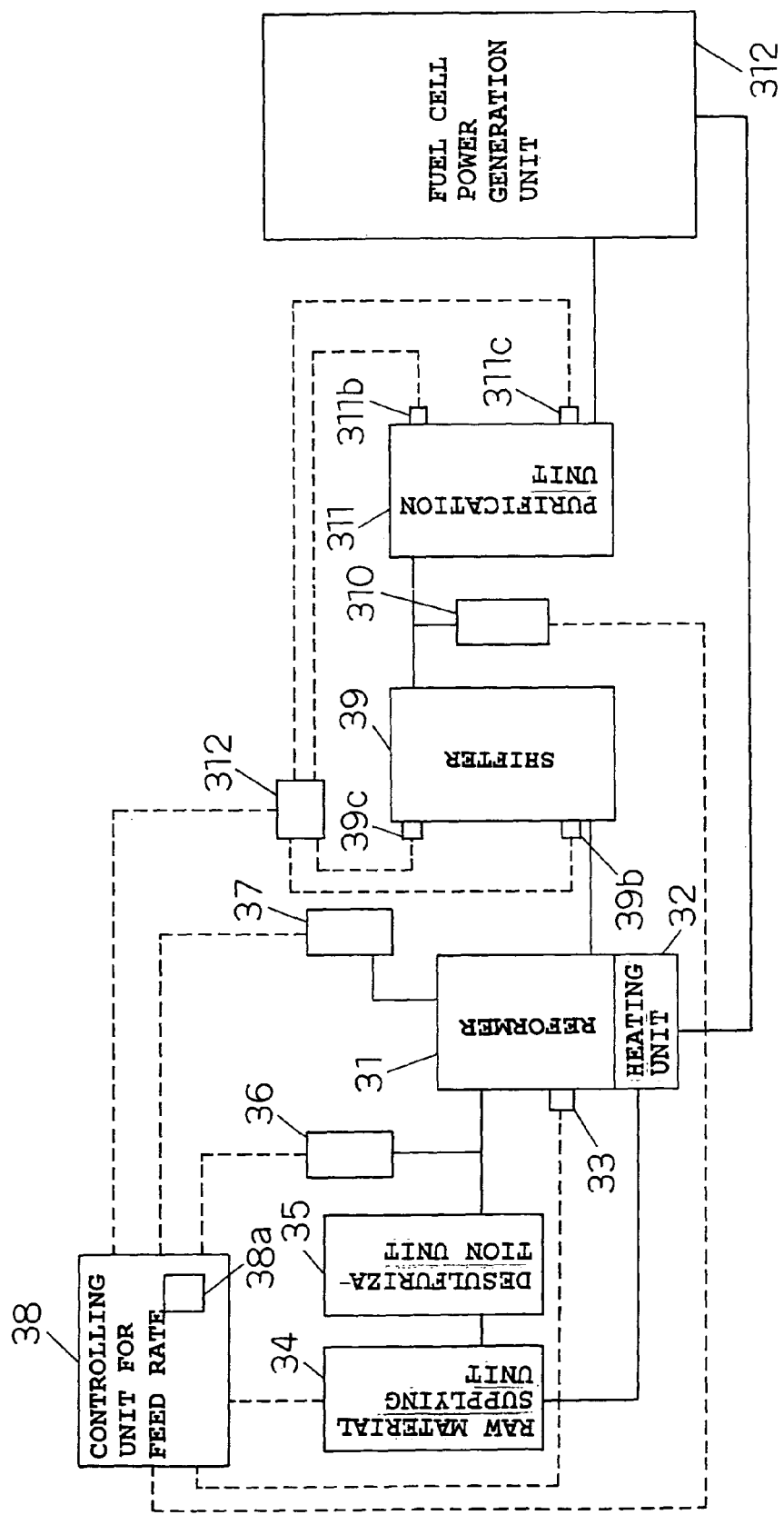
FIG. 13 is a block diagram of the hydrogen generator Embodiment 11 of the present invention.

Embodiment 11 of the present invention will now be described. FIG. 13 is a block diagram of a fuel cell system in Embodiment 11 of the present invention. The apparatus of Embodiment 11 has a configuration almost identical to the apparatus shown in Embodiment 1. The apparatus of this Embodiment differs from that of Embodiment 1 in that a fuel cell power generation unit 312 is provided. The fuel cell power generation unit 312 has a polymer electrolyte fuel cell as a power generation unit, and hydrogen gas after the purification unit 311 is supplied to the anode side of the fuel cell power generation unit 312. In addition, unused hydrogen gas on the anode side is supplied to the heating unit 32 of the reformer 31. Detailed description of the fuel cell power generation unit 312 is not presented here.

An example of operation where hydrogen gas produced by the hydrogen generator is supplied to the fuel cell power generation unit 312 in this Embodiment will now be described. However, the apparatus operation at the time of starting and stopping the apparatus constitutes the feature of the present invention as in Embodiment 10, only this aspect will be described, and description of other operations will not be presented.

As shown in Embodiment 10, the hydrogen generator introduces air as an oxidation gas from the reforming air supplying unit 36 to replace gas in the apparatus safely and conveniently at the time of starting and stopping the apparatus.

In this Embodiment, gas existing on the anode side of the fuel cell power generation unit 312 is also replaced with the gas used for replacement of gas in the hydrogen generator. Also on the anode side of the fuel cell power generation unit 312, a combustible gas may remain at the time of starting the apparatus, and hydrogen gas supplied exits immediately before the apparatus is stopped. Replacement should be done quickly in view of safety as in the case of the hydrogen generator.

Thus, gas on the anode side of the fuel cell power generation unit 312 is first replaced with the gas with which gas in the hydrogen generator has been replaced at the time of starting and stopping the apparatus. Furthermore, if a large amount of carbon monoxide is contained in the gas with which gas in the hydrogen generator has been replaced, the catalytic activity on the anode side may be decreased. Therefore, whether the replacement operation is to be carried out or not is determined according to the level of carbon monoxide generated in the hydrogen generator, and if the replacement operation is to be carried out, the operation period should be determined. One example of conditions for the replacement operation is that the concentration of carbon monoxide contained in the gas with which gas in the hydrogen generator has been replaced is 100 ppm or lower.

In addition, from a viewpoint of completely supplying an inert gas, it is desirable that the controlling unit for feed rate 38 is operated to supply an oxidation gas in an amount equal to or larger than the theoretical amount of oxygen for completely oxidizing the raw material, and the gas is used to replace gas in the hydrogen generator and the fuel cell power generation unit 312.

In addition, if the dew point of steam in the replacing gas is high, the steam in the replacing gas maybe condensed in the fuel cell power generation unit to cause the choking of the channel if the operation temperature of the fuel cell power generation unit 312 is lower than the dew point of steam, for example. Thus, it is desirable that the fuel cell power generation unit 312 is provided with cell temperature detecting means of measuring the operation temperature, and the controlling unit for feed rate 38 is operated to control the amount of water supplied so that the detected temperature is lower than the dew point of steam in the replacing gas.

Furthermore, during normal operation, hydrogen gas is produced as shown in Embodiment 1, the hydrogen gas is supplied from the purification unit 311 to the anode side of the fuel cell power generation unit 312 to generate a power with the fuel cell. In the fuel cell, about 70 to 80% of supplied hydrogen gas is made to undergo a reaction, while the remaining hydrogen gas is fed to the heating unit 32 of the reformer 31 so that the hydrogen gas is burned and used in the reforming reaction. In addition, heat generated in the fuel cell is collected as in the form of hot water and used for hot water supply.

Furthermore, in the above Embodiments, the reformer 31 is equivalent to the reformer of the present invention, the controlling unit for feed rate 38 is equivalent to the controlling unit for feed rate of the present invention, the raw material supplying unit 34 is equivalent to the raw material supplying unit of the present invention, the water supplying unit 37 is equivalent to the water supplying unit of the present invention, the reforming air supplying unit 36 is equivalent to the oxidation gas supplying unit of the present invention, the reforming catalyst unit 31c is equivalent to the reforming catalyst unit of the present invention, the reforming catalyst 31c is equivalent to the reforming catalyst of the present invention, and the controlling unit for feed rate 38 is equivalent to the controlling unit for feed rate of the present invention. In addition, the desulfurization unit 35 is equivalent to the desulfurization unit of the present invention.

Furthermore, the present invention is a program of making a computer perform the function of the above described controlling unit for feed rate of the hydrogen generator of the present invention, wherein the program operates in cooperation with the computer.

The present invention is a program of making a computer perform the operation of steps (processes, operations, actions, etc.) of the whole or part of the above described method of controlling the hydrogen generator of the present invention, wherein the program operates in cooperation with the computer.

The present invention is a medium carrying a program of making a computer perform all or part of functions of the above described controlling unit for feed rate of the hydrogen generator of the present invention, wherein the program readable and read by the computer performs the functions in cooperation with the computer.

The "part" in the present invention means a partial function or partial operation within one unit.

In addition, one aspect of use of the program of the present invention may be an aspect in which the program is recorded in a recording medium readable by a computer, and operates in cooperation with the computer.

In addition, one aspect of use of the program of the present invention may be an aspect in which the program is transmitted through a transmission medium, is read by a computer, and operates in cooperation with the computer.

In addition, data structures of the present invention include a database, a data format, a data table, a data list and types of data.

In addition, recording media include a ROM, transmission media include transmission media such as Internet, a light, a radio wave and a sound wave.

In addition, the above described computer of the present invention is not limited to sheer hardware, but may include firmware, an OS and peripheral equipment.

Furthermore, as described above, the configuration of the present invention may be achieved in terms of software, or may be achieved in terms of hardware.

INDUSTRIAL APPLICABILITY

As described above, the present invention improves the sulfur resistance of a hydrogen generator, thus enabling the apparatus to be used over the long run. In addition, the present invention provides an effect of enabling the apparatus to be used over the long run and eliminating the necessity of replacement with an inert gas.

The invention claimed is:

1. A hydrogen generator comprising:
    a reformer producing hydrogen gas, said reformer provided with a reforming catalyst body making a raw material react with water;
    a raw material supplying unit supplying said raw material to said reformer;
    a water supplying unit supplying said water to said reformer;
    an oxidation gas supplying unit supplying an oxidation gas containing at least oxygen to said reforming catalyst body; and
    a controlling unit for feed rate controlling the supply of said raw material, said water and said oxidation gas,
    wherein the amount of oxidation gas supplied from said oxidation gas supplying unit to said reforming catalyst body is defined based on the content of sulfur component contained in said raw material.

2. The hydrogen generator according to claim 1, wherein said amount of oxidation gas is defined as an amount allowing at least said sulfur component to be at least fully oxidized.

3. The hydrogen generator according to claim 1, comprising a sulfur concentration detecting unit measuring the content of sulfur component contained in said raw material, wherein
    the amount of oxidation gas supplied from said oxidation gas supplying unit to said reforming catalyst body is defined based on the content of sulfur component measured by said sulfur concentration detecting unit.

4. The hydrogen generator according to claim 1, comprising a temperature detecting unit measuring the temperatures of said reforming catalyst body and/or a gas in said reforming catalyst body,
    wherein said controlling unit for feed rate compares the detected temperature detected by said temperature detecting unit with a predetermined reference value determined in advance, and
    a temperature equal to or higher than said reference value indicates that the content of said sulfur component increases at the time when said raw material, said water and said oxidation gas are supplied in predetermined reference amounts.

5. The hydrogen generator according to claim 4, wherein said controlling unit for feed rate controls so that the oxidation gas is supplied in an amount larger than said reference amount if said detected temperature exceeds said reference value.

6. The hydrogen generator according to claim 4, wherein if said detected temperature exceeds said reference value,
    said controlling unit for feed rate controls so that at the time of stopping the generation of hydrogen gas, the oxidation gas is supplied in an amount larger than said predetermined reference amount, and thereafter the supply of said raw material, said water and said oxidation gas is stopped.

7. The hydrogen generator according to claim 4, comprising a memory unit memorizing the fact that said detected temperature exceeds said reference value, wherein if said memory unit remembers the fact that said reference value has been exceeded at the time of starting the apparatus,
    said controlling unit for feed rate controls so that the oxidation gas is supplied in an amount larger than said predetermined reference amount, and thereafter said raw material, said water and said oxidation gas are supplied in said predetermined reference amount.

8. The hydrogen generator according to claim 4, wherein said temperature detecting unit is provided at a location allowing said temperature detecting unit to measure the temperatures of said reforming catalyst body and/or a gaseous body in said reforming catalyst body located from the midstream to the downstream with respect to the flow of said raw material in said reformer.

9. A method of controlling a hydrogen generator in which the supply of raw material, water and oxidation gas is controlled in a hydrogen generator comprising:

a reformer producing hydrogen gas, said reformer provided with a reforming catalyst body making said raw material react with said water;

a raw material supplying unit supplying said raw material to said reformer;

a water supplying unit supplying said water to said reformer; and an oxidation gas supplying unit supplying said oxidation gas containing at least oxygen to said reforming catalyst body, wherein the amount of oxidation gas to be supplied from said oxidation gas supplying unit to said reforming catalyst body is defined based on the content of sulfur component contained in said raw material.

10. A program of making a computer function as the whole or part of the controlling unit for feed rate controlling the supply of said raw material, said water and said oxidation gas in the hydrogen generator according to claim 1.

11. A medium storing the program according to claim 10, said medium capable of being processed by a computer.

* * * * *

UNITED STATES PATENT AND TRADEMARK OFFICE
CERTIFICATE OF CORRECTION

PATENT NO. : 7,132,178 B2
APPLICATION NO. : 10/344475
DATED : November 7, 2006
INVENTOR(S) : Kunihiro Ukai et al.

It is certified that error appears in the above-identified patent and that said Letters Patent is hereby corrected as shown below:

Title Page (Page 2), Item (56) References Cited, FOREIGN PATENT DOCUMENTS
Delete duplicate reference "JP 2765950 B2"

Title Page (Page 2), Item (56) References Cited, FOREIGN PATENT DOCUMENTS
Change "WO  WO 00/54879  9/2000"
To -- WO  00/54879  9/2000 --

Title Page (Page 2), Item (56) References Cited, OTHER PUBLICATIONS
Change "Office Action from the Patent Office of the State Intellectual Property Office of the People's Republic of China, dated Aug. 27, 204 (English Translation)"
To
-- Office Action from the Patent Office of the State Intellectual Property Office of the People's Republic of China, dated Aug. 27, 2004 (English Translation) --

Title Page, Item (57), Replace the Abstract with the following:
-- Many organic raw materials contain sulfur components, and the sulfur component is a catalyst poisoning component for their catalysts to decrease steam reforming reactivity. A hydrogen generator including a raw material supplying unit supplying a raw material containing a sulfur component and composed of an organic compound, a water supplying unit supplying water, a reformer producing hydrogen gas, the reformer provided with a reforming catalyst to make the raw material and water undergo a reaction, and a carbon monoxide removing unit reducing the content of carbon monoxide in hydrogen gas produced in the reformer, wherein the reforming catalyst is constituted by a carrier composed of platinum and a metal oxide is provided. --

Signed and Sealed this

Twenty-fourth Day of April, 2007

JON W. DUDAS
*Director of the United States Patent and Trademark Office*